(12) United States Patent
Kwak et al.

(10) Patent No.: US 10,681,195 B2
(45) Date of Patent: Jun. 9, 2020

(54) ELECTRONIC DEVICE INVOLVING DISPLAY

(71) Applicant: Samsung Electronics Co., Ltd., Suwon-si, Gyeonggi-do (KR)

(72) Inventors: Woon Geun Kwak, Seongnam-si (KR); Jung Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/856,519

(22) Filed: Dec. 28, 2017

(65) Prior Publication Data

US 2018/0183913 A1 Jun. 28, 2018

(30) Foreign Application Priority Data

Dec. 28, 2016 (KR) ........................ 10-2016-0181474

(51) Int. Cl.
*H04M 1/00* (2006.01)
*H04M 1/02* (2006.01)
*G06F 1/16* (2006.01)
*G06F 3/14* (2006.01)

(52) U.S. Cl.
CPC ........ *H04M 1/0268* (2013.01); *G06F 1/1647* (2013.01); *G06F 1/1675* (2013.01); *G06F 1/1698* (2013.01); *G06F 3/1423* (2013.01); *H04M 1/026* (2013.01); *H04M 1/0249* (2013.01); *H04M 1/0266* (2013.01); *H04M 1/0277* (2013.01); *H04M 2250/16* (2013.01)

(58) Field of Classification Search
CPC .... G06F 1/1647; G06F 3/1423; G06F 1/1698; G06F 1/1675; H04M 1/0268; H04M 1/0266; H04M 2250/16; H04M 1/0249; H04M 1/0277; H04M 1/022

See application file for complete search history.

(56) References Cited

U.S. PATENT DOCUMENTS

| | | | |
|---|---|---|---|
| 8,665,236 B2 | 3/2014 | Myers | |
| 8,896,563 B2 | 11/2014 | Myers | |
| 9,146,590 B2 | 9/2015 | Myers | |
| 9,367,095 B2 | 6/2016 | Myers | |
| 9,983,630 B2 | 5/2018 | Myers | |

(Continued)

FOREIGN PATENT DOCUMENTS

| | | |
|---|---|---|
| CN | 103747123 A | 4/2014 |
| CN | 104992626 A | 10/2015 |

(Continued)

OTHER PUBLICATIONS

International Search Report dated Apr. 20, 2018, issued in International Patent Application No. PCT/KR2017/015662.

(Continued)

*Primary Examiner* — Nhan T Le
(74) *Attorney, Agent, or Firm* — Jefferson IP Law, LLP

(57) ABSTRACT

An electronic device is provided. The electronic device includes a housing, a display that includes a first display part, a second display part, and a third display part, and a display driver integrated circuit (IC) (DDI). The first display part includes a first active area, the second display part includes a second active area, and the third display part includes at least one optically transparent layer.

18 Claims, 16 Drawing Sheets

(56) References Cited

U.S. PATENT DOCUMENTS

| | | |
|---|---|---|
| 10,048,538 B1 * | 8/2018 | Fukuoka ............... F21S 2/00 |
| 2010/0289760 A1 | 11/2010 | Jonoshita et al. |
| 2011/0261002 A1 | 10/2011 | Verthein |
| 2013/0076612 A1 | 3/2013 | Myers |
| 2013/0083467 A1 * | 4/2013 | Becze ............... G06F 3/1438 |
| | | 361/679.27 |
| 2014/0191952 A1 | 7/2014 | Myers |
| 2015/0043139 A1 | 2/2015 | Myers |
| 2015/0138041 A1 * | 5/2015 | Hirakata ............ G06F 3/1446 |
| | | 345/1.3 |
| 2015/0146069 A1 | 5/2015 | Yamazaki et al. |
| 2015/0212784 A1 | 7/2015 | Myers |
| 2016/0188197 A1 | 6/2016 | Ryu et al. |
| 2016/0252933 A1 | 9/2016 | Myers |
| 2016/0320966 A1 | 11/2016 | Ryu et al. |
| 2016/0343777 A1 | 11/2016 | Hirakata et al. |
| 2017/0018258 A1 | 1/2017 | Yeung |
| 2019/0075243 A1 | 3/2019 | Yamazaki et al. |
| 2019/0108787 A1 | 4/2019 | Hirakata et al. |
| 2019/0258397 A1 | 8/2019 | Ryu et al. |

FOREIGN PATENT DOCUMENTS

| | | |
|---|---|---|
| JP | 2009-71735 A | 4/2009 |
| WO | 2016-023455 A1 | 2/2016 |

OTHER PUBLICATIONS

European Search Report dated Sep. 10, 2019; European Appln. No. 17885492.3-1216 / 3533211 PCT/KR2017015662.

\* cited by examiner

ELECTRONIC DEVICE INVOLVING DISPLAY

CROSS-REFERENCE TO RELATED APPLICATION(S)

This application claims the benefit under 35 U.S.C. § 119(a) of a Korean patent application filed on Dec. 28, 2016 in the Korean Intellectual Property Office and assigned Serial number 10-2016-0181474, the entire disclosure of which is hereby incorporated by reference.

TECHNICAL FIELD

The present disclosure relates to an electronic device involving a display.

BACKGROUND

Electronic devices, such as smartphones, tablet personal computers (PCs), and the like, may output contents, such as an image, text, or the like, through displays thereof. Electronic devices having various forms of displays have been released. In recent years, flexible displays have been developed.

Flexible displays may be bent or curved. Flexible displays are advantageous in that the flexible displays provide efficiencies in physical space utilization through transformation and are thin, light, and unbreakable. Flexible displays may be applied to a variety of fields, such as wearable smart devices, automotive displays, digital signage, and the like, as well as smartphones.

Flexible displays may be classified into a curved display, a bendable display, a rollable display, and the like according to their flexibility. A curved display may be fixed in a curved shape and thus may not be transformed. A bendable display may be bent just partly. A rollable display may be freely rolled up or bent to thereby provide remarkably increased efficiency in space utilization.

The above information is presented as background information only to assist with an understanding of the present disclosure. No determination has been made, and no assertion is made, as to whether any of the above might be applicable as prior art with regard to the present disclosure.

SUMMARY

An electronic device according to the related art is implemented with a single-sided display, or operates in such a manner that the single display is divided into a plurality of areas to output contents. The display occupies a large area in the electronic device. For example, a display occupies almost the entire front surface of a smartphone. Even in this case, an area (e.g., a bezel area) through which contents are not output exists around the display.

Aspects of the present disclosure are to address at least the above-mentioned problems and/or disadvantages and to provide at least the advantages described below. Accordingly, an aspect of the present disclosure is to provide a method and an electronic device for reducing an inactive area around a display through which contents are not output.

In accordance with an aspect of the present disclosure, an electronic device is provided. The electronic device includes a housing that includes a first surface facing a first direction, a second surface facing a second direction opposite to the first direction, and a side surface surrounding space between the first surface and the second surface, a display that includes a first display part, a second display part, and a third display part, and at least one display driver integrated circuit (IC) (DDI) disposed inside the housing and electrically connected to the display. The first display part includes a first active area exposed through at least a portion of the first surface, and the second display part includes a second active area exposed through at least a portion of the second surface. The third display part is curved along a portion of the side surface from the first display part to the second display part and includes at least one optically transparent layer.

In accordance with another aspect of the present disclosure, an electronic device is provided. The electronic device may include a multi-display of a full-screen form. The multi-display may be implemented by bending a single display panel or by disposing two display panels on the front and rear sides of the electronic device, respectively.

In accordance with another aspect of the present disclosure, an electronic device is provided. The electronic device may use a single display panel and may reduce a black matrix (BM) area by removing a light-emitting device from a bent region of the display panel.

In accordance with another aspect of the present disclosure, an electronic device is provided. The electronic device may use two display panels and may reduce a BM area or an inactive (non-active) area by mounting a flexible printed circuit board (FPCB) or a DDI on a nearby mechanical part, such as a camera module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
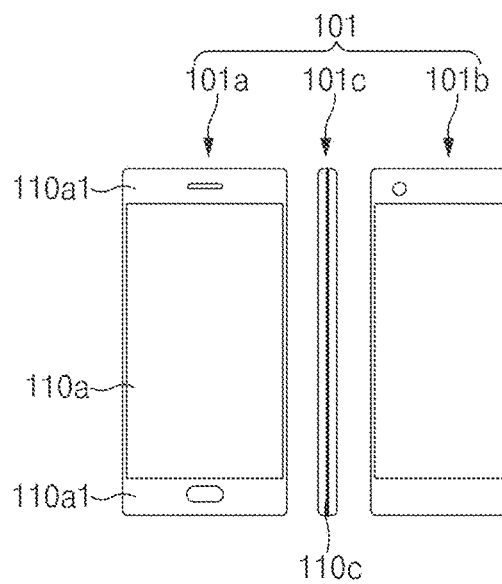
FIGS. 1A, 1B, 1C, and 1D illustrate electronic devices having a multi-display, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there is no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smart-phones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, or wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital video disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or Play Station™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIGS. 1A to 1D illustrate electronic devices having a multi-display, according to various embodiments of the present disclosure. First to fourth electronic devices 101 to 104 of FIGS. 1A to 1D are merely illustrative, and the present disclosure is not limited thereto.

Referring to FIGS. 1A to 1D, the first to fourth electronic devices 101 to 104 may have a multi-display (e.g., a dual display). For example, the multi-display may include a first active area mainly disposed on a first surface facing a first direction and a second active area mainly disposed on a second surface facing a second direction that is opposite to the first direction. Part of the first active area and part of the second active area may extend to side surfaces between the first surface and the second surface.

According to various embodiments, the first to fourth electronic devices 101 to 104 may output various types of contents by using the active areas disposed on the plurality of surfaces thereof. For example, the first to fourth electronic devices 101 to 104 may output a video on the first active area as a full screen and may output an Internet browser application on the second active area. A user may watch the video through the first active area and may turn over the electronic devices 101 to 104 to do a search on the Internet through the second active area.

According to various embodiments, the first electronic device 101 of FIG. 1A may include a housing that includes a first surface 101a facing the first direction, a second surface 101b facing the second direction opposite to the first direction, and side surfaces 101c between the first surface 101a and the second surface 101b. The first electronic device 101 may include a first active area 110a on the first surface 101a and a second active area 110b on the second surface 101b. For example, the first active area 110a and the second active area 110b may output different contents.

According to an embodiment, the first active area 110a may be disposed on the substantially central region of the first surface 101a. A physical button, a speaker, a camera, or a sensor window may be disposed on a peripheral region 110a1 around the first active area 110a. The peripheral region 110a1 may be an inactive (non-active) area on which separate contents are not displayed. Components relating to the physical button, the speaker, the camera, or the sensor window, or interconnection wiring or chips for driving the first active area 110a may be mounted inward of the peripheral region 110a1.

According to an embodiment, the second active area 110b may be disposed on the substantially central region of the second surface 101b. A camera module may be disposed on a peripheral region 110b1 around the second active area 110b. The peripheral region 110b1 around the second active area 110b may be an inactive (non-active) area on which separate contents are not displayed. Components relating to the camera module, or interconnection wiring or chips for driving the second active area 110b may be mounted inward of the peripheral region 110b1.

According to an embodiment, the side surfaces 101c may be disposed between the first surface 101a and the second surface 101b. The side surfaces 101c may face third directions perpendicular to the first direction or the second direction. In an embodiment, the side surfaces 101c may be curved outwards with a specified curvature. In various embodiments, part of the first active area 110a and part of the second active area 110b may extend to the side surfaces 101c.

In various embodiments, the first electronic device 101 may include side bezels (or side parts) 110c on the side surfaces 101c thereof. The side bezels 110c may divide the first active area 110a and the second active area 110b, or may divide window covers that cover the respective active areas 110a and 110b. The side bezels 110c may be implemented by extending a housing inside the first electronic device 101, or may be implemented with a separate structure mounted on a display panel. For example, the side bezels 110c may be formed of a material, such as plastic, metal, or the like. Additional information about the side bezels 110c may be provided through FIG. 2.

Figure 1B:
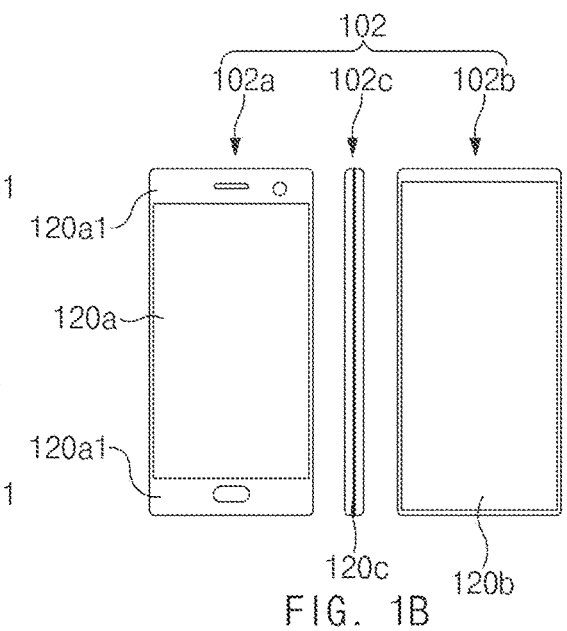

According to various embodiments, the second electronic device 102 of FIG. 1B may include a housing that includes a first surface 102a facing the first direction, a second surface 102b facing the second direction opposite to the first direction, and side surfaces 102c between the first surface 102a and the second surface 102b. The second electronic device 102 may include a first active area 120*a* on the first surface 102*a* and a second active area 120*b* on the second surface 102*b*.

According to an embodiment, the first active area 120*a* may be disposed on the substantially central region of the first surface 102*a*. A physical button, a speaker, a sensor window, or a camera lens may be disposed on a peripheral region 120*a*1 around the first active area 120*a*. The configuration of the first surface 102*a* may be the same as, or similar to, the configuration of the first surface 101*a* of the first electronic device 101.

According to an embodiment, the second active area 120*b* may be disposed on the entire region (or substantially the entire region) of the second surface 102*b*. For example, the second active area 120*b* may be disposed such that an inactive (non-active) area is completely removed from the second surface 102*b*. In another example, the second active area 120*b* may be disposed such that an inactive (non-active) area is limited to an edge of the second surface 102*b*. Unlike the second surface 101*b* of the first electronic device 101, the second surface 102*b* of the second electronic device 102 may not have a separate camera lens disposed thereon. A user may use the second active area 120*b* with a relatively large range.

According to various embodiments, an inactive (non-active) area (e.g., an interconnection wiring area) for driving the second active area 120*b* may be formed on the side surfaces 102*c*. In this case, a separate inactive (non-active) area may not be formed on the second surface 102*b*.

According to various embodiments, the second electronic device 102 may include side bezels (or side parts) 120*c* on the side surfaces 102*c* thereof. The configuration of the side surfaces 102*c* may be the same as, or similar to, the configuration of the side surfaces 101*c* of the first electronic device 101.

Figure 1C:
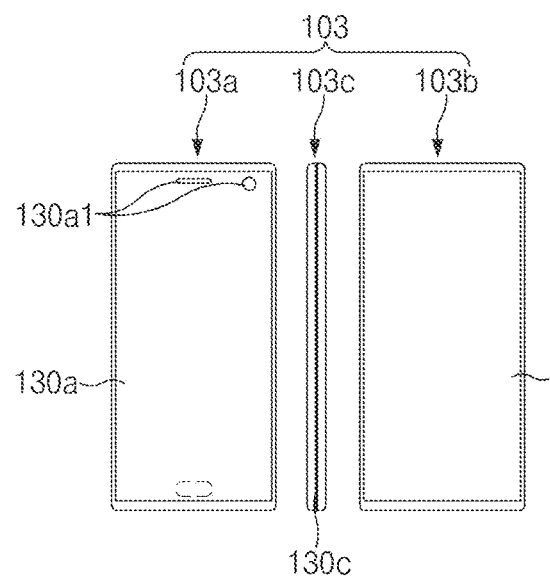

According to various embodiments, the third electronic device 103 of FIG. 1C may include a housing that includes a first surface 103*a* facing the first direction, a second surface 103*b* facing the second direction opposite to the first direction, and side surfaces 103*c* between the first surface 103*a* and the second surface 103*b*. The third electronic device 103 may include a first active area 130*a* on the first surface 103*a* and a second active area 130*b* on the second surface 103*b*.

According to an embodiment, the first active area 130*a* may be disposed on the entire region (or substantially the entire region) of the first surface 103*a*. In various embodiments, the first active area 130*a* may include through-holes (or openings) 130*a*1 through which a speaker, a sensor window, or a camera lens is exposed to the outside. A user may use the first active area 130*a* larger than the first active areas 110*a* and 120*a* of the first and second electronic devices 101 and 102.

According to an embodiment, a minimal inactive (non-active) area for driving the first active area 130*a* may be formed on an edge region of the first surface 103*a*. For example, an inactive (non-active) area for driving the first active area 130*a* may be displaced to the side surfaces 103*c*. The first active area 130*a* may occupy substantially the entire region of the first surface 103*a*.

The second active area 130*b* may be disposed on the entire region (or substantially the entire region) of the second surface 103*b*. The second active area 130*b* may not include a separate through-hole, as opposed to the first active area 130*a*.

According to various embodiments, an inactive (non-active) area (e.g., an interconnection wiring area) for driving the second active area 130*b* may be formed on the side surfaces 103*c*. A separate inactive (non-active) area may not be formed on the second surface 103*b*.

According to various embodiments, the third electronic device 103 may include side bezels (or side parts) 130*c* on the side surfaces 103*c* thereof. The configuration of the side surfaces 103*c* may be the same as, or similar to, the configuration of the side surfaces 101*c* of the first electronic device 101.

Figure 1D:
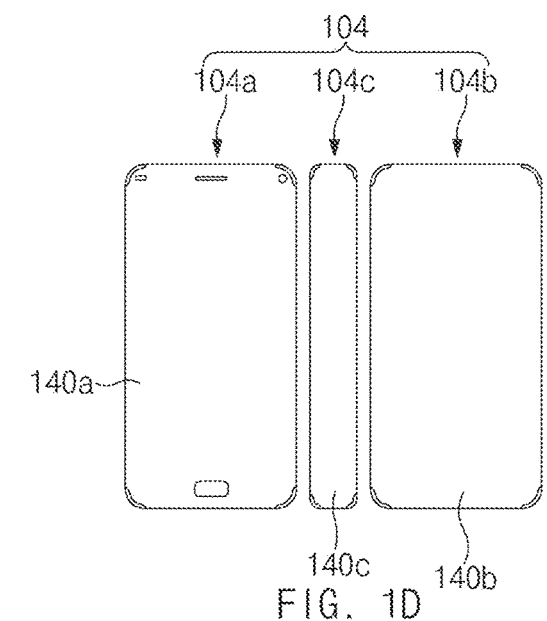

According to various embodiments, the fourth electronic device 104 of FIG. 1D may include a housing that includes a first surface 104*a* facing the first direction, a second surface 104*b* facing the second direction opposite to the first direction, and side surfaces 104*c* between the first surface 104*a* and the second surface 104*b*. The fourth electronic device 104 may include a first active area 140*a* on the first surface 104*a* and a second active area 140*b* on the second surface 104*b*.

According to various embodiments, the fourth electronic device 104 may also include a third active area 140*c* on the side surfaces 104*c* disposed between the first surface 104*a* and the second surface 104*b*, in addition to the first and second active areas 140*a* and 140*b* on the first and second surfaces 104*a* and 104*b*. The third active area 140*c* may be formed by extending the first active area 140*a* or the second active area 140*b*.

According to various embodiments, the fourth electronic device 104 may have a structure in which an inactive (non-active) area is minimized by extending the range of the active areas if possible. For example, the inactive (non-active) area of the fourth electronic device 104 may be limited to corner portions of the fourth electronic device 104.

In FIGS. 1A to 1D, a window cover may be mounted on the exterior of the active areas of the first to fourth electronic devices 101 to 104. Each active area may include a touch panel or a display panel therein. The display panel may be implemented in a curved or flexible form. In various embodiments, active areas may be formed on a single display panel, or may be implemented with different display panels, respectively. Additional information about the form of the display panel may be provided through FIGS. 2 to 13.

Figure 2:
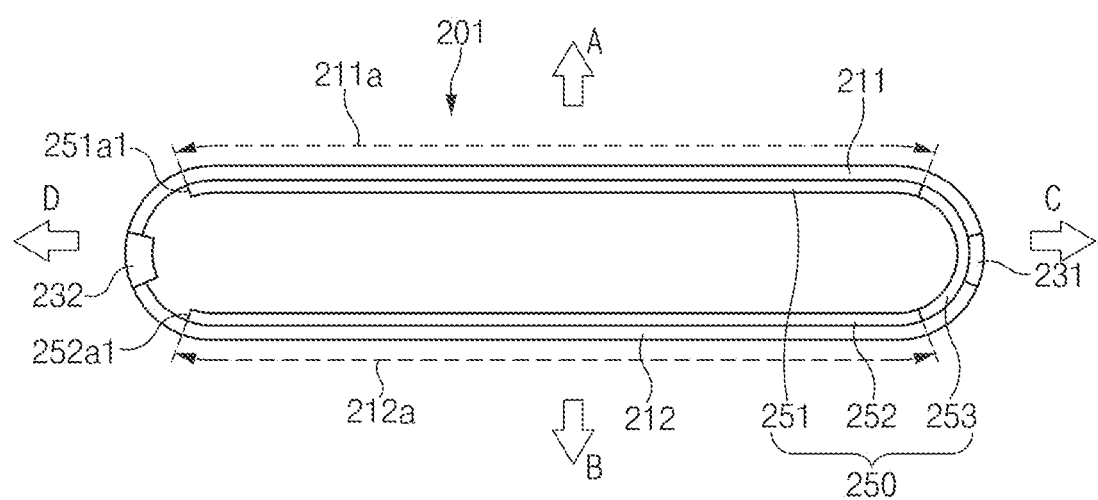
FIG. 2 is a sectional view of an electronic device according to various embodiments of the present disclosure.

FIG. 2 is a sectional view of an electronic device according to various embodiments of the present disclosure. An electronic device 201 may be any one of the first to fourth electronic devices 101 to 104 illustrated in FIGS. 1A to 1D.

Referring to FIG. 2, a multi-display of the electronic device 201 may be implemented by using a single display panel 250. The electronic device 201 may include a first window cover 211, a second window cover 212, a first side bezel (or a first side part) 231, a second side bezel (or a second side part) 232, and the display panel 250.

According to an embodiment, the first window cover 211 may cover a first surface A, a portion of a first side surface C, and a portion of a second side surface D of the electronic device 201. The first window cover 211 may protect the display panel 250 and internal elements. A portion 211*a* of the first window cover 211 may pass light emitted from a first display part 251 of the display panel 250.

According to an embodiment, the first window cover 211 may have a shape corresponding to the display panel 250 (e.g., the first display part 251) adjacent thereto. For example, the first window cover 211 may have a flat region corresponding to a flat region of the display panel 250. The first window cover 211 may have curved regions corresponding to curved regions of the display panel 250 that are adjacent to the side surfaces of the electronic device 201.

According to an embodiment, the second window cover 212 may cover a second surface B, a portion of the first side surface C, and a portion of the second side surface D of the electronic device 201. The second window cover 212 may protect the display panel 250 and the internal elements. A portion 212a of the second window cover 212 may pass light emitted from a second display part 252 of the display panel 250.

According to an embodiment, the second window cover 212 may have a shape corresponding to the display panel 250 (e.g., the second display part 252) adjacent thereto. For example, the second window cover 212 may have a flat region corresponding to a flat region of the display panel 250. The second window cover 212 may have curved regions corresponding to curved regions of the display panel 250 that are adjacent to the side surfaces of the electronic device 201.

According to an embodiment, the first side bezel 231 may be disposed on the first side surface C of the electronic device 201. The first side bezel 231 may fix or separate the first window cover 211 and the second window cover 212. The first side bezel 231 may be disposed to cover at least a portion of a third display part 253 of the display panel 250. In various embodiments, the first side bezel 231 may be disposed on the substantially central region of the first side surface C of the electronic device 201.

According to various embodiments, the first side bezel 231 may be a metal structure including a metal material. For example, the first side bezel 231 may be used as an antenna radiator that transmits and receives a specified frequency signal.

According to an embodiment, the second side bezel 232 may be disposed on the second side surface D of the electronic device 201. The second side bezel 232 may fix or separate the first window cover 211 and the second window cover 212. The second side bezel 232 may be disposed at a position adjacent to opposite ends 251a1 and 252a1 of the display panel 250.

According to various embodiments, the second side bezel 232 may be a part extending from a housing inside the electronic device 201 to the outside, or may be a separate structure attached to the extending part of the housing. In various embodiments, the second side bezel 232 may include a metal material. The second side bezel 232 may be used as an antenna radiator that transmits and receives a specified frequency signal.

According to various embodiments, interconnection wiring and a flexible printed circuit board (FPCB) connected to the opposite ends 251a1 and 252a1 of the display panel 250 or a display driver integrated circuit (IC) (DDI) may be disposed near the second side bezel 232. The electronic device 201 may have two active areas implemented with the single display panel 250. The interconnection wiring and the DDI for driving the display panel 250 may be provided near the second side bezel 232, whereas a separate DDI may not be provided near the first side bezel 231.

According to an embodiment, the display panel 250 may include the first display part 251, the second display part 252, and the third display part 253.

According to an embodiment, the first display part 251 may include a first active area exposed through at least a portion of the first surface A of the electronic device 201. The second display part 252 may include a second active area exposed through at least a portion of the second surface B of the electronic device 201.

The third display part 253 may be curved along a portion of the first side surface C from the first display part 251 to the second display part 252 and may include at least one optically transparent layer.

The first display part 251 and the second display part 252 may be areas on which contents, such as an image, text, or the like, are output. The first display part 251 may be arranged to face the first surface A of the electronic device 201. The second display part 252 may be arranged to face the second surface B of the electronic device 201. The first display part 251 may be brought into close contact with an inner surface of the first window cover 211. The second display part 252 may be brought into close contact with an inner surface of the second window cover 212.

According to various embodiments, the first display part 251 and the second display part 252 may be curved outwards at positions adjacent to the first side surface C and the second side surface D. The third display part 253 may be disposed adjacent to the first side surface C. The third display part 253 may be disposed between the first display part 251 and the second display part 252. The third display part 253 may be implemented in a curved shape. For example, the third display part 253 may be curved outwards with a specified curvature.

According to various embodiments, the third display part (or the non-display part) 253 may be an area incapable of outputting contents, such as an image, text, or the like. Some components emitting light in response to an electrical signal may be removed from at least a portion of the third display part 253, or the number of components may be limited to a specified number or less. For example, at least a portion of the third display part 253 may be an area from which an organic light emitting device is removed. Additional information about an internal configuration of the third display part 253 may be provided through FIG. 4.

According to an embodiment, a touch panel (not illustrated) may be additionally disposed between the display panel 250 and the first and second window covers 211 and 212. The touch panel may be stuck to the display panel 250 and the first and second window covers 211 and 212. According to another embodiment, the display panel 250 may be an integrated panel that includes a touch panel.

According to an embodiment, a FPCB and a DDI may be connected to one of the opposite ends 251a1 and 252a1 of the display panel 250. The first display part 251 and the second display part 252 of the display panel 250 may be driven by a single DDI. Additional information about an arrangement of components near the display panel 250 may be provided through FIG. 3.

Figure 3:
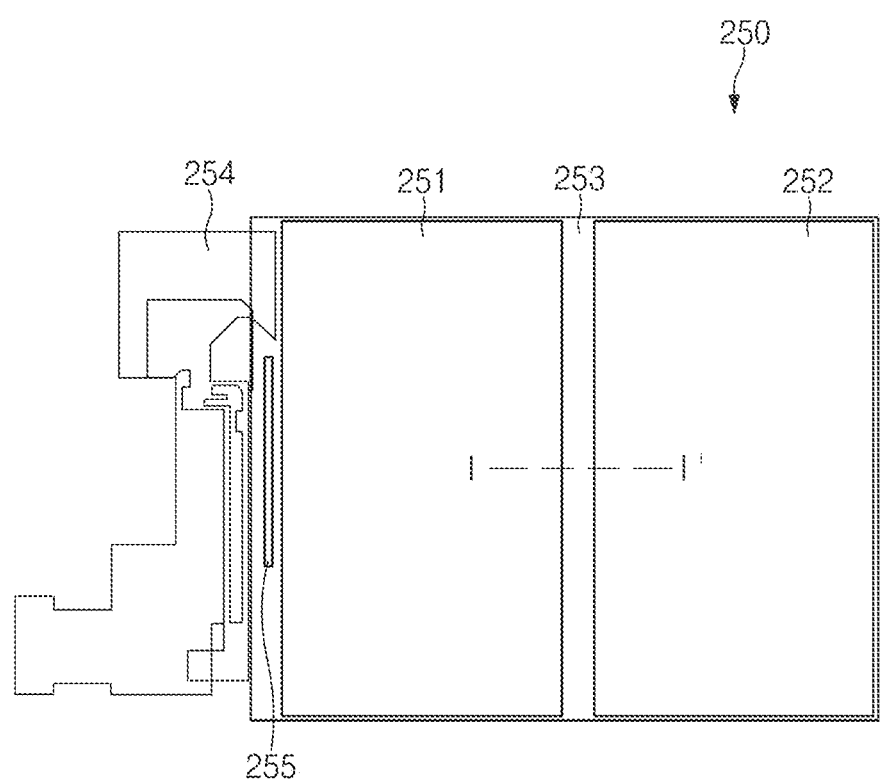
FIG. 3 illustrates a display panel and a driver integrated circuit (IC) according to various embodiments of the present disclosure.

FIG. 3 illustrates a display panel and a driver IC according to various embodiments of the present disclosure.

Referring to FIG. 3, the display panel 250 may include the first display part 251, the second display part 252, and the third display part 253. At least a part of the display panel 250 may have a curved or flexible form. For example, the display panel 250 may be mounted in a shape in which the display panel 250 is curved along the first side surface C of the electronic device 201. The first display part 251 may output contents through the first surface A of the electronic device 201 that faces the first direction, and the second display part 252 may output contents through the second surface B of the electronic device 201 that faces the second direction opposite to the first direction.

According to an embodiment, interconnection wires for driving pixels that constitute the first and second display parts 251 and 252 may extend from side surfaces of the first and second display parts 251 and 252 and may be connected with a DDI 255. According to an embodiment, a separate interconnection wire may not be connected to the third display part 253.

According to an embodiment, the third display part 253 may connect the first display part 251 and the second display part 252. The third display part 253 may be an area on which contents, such as an image, text, or the like, are not output. For example, the third display part 253 may be an area that does not include light emitting elements. Additional information about a configuration of the third display part 253 may be provided through FIG. 4.

According to an embodiment, a pad (or film) 254 may transmit signals for driving the first display part 251 and the second display part 252. The pad 254 may include interconnection wires connected to the first display part 251 and the second display part 252. In the case where the pad 254 is mounted in the electronic device 201, the pad 254 may be hidden by a black matrix (BM) area (an area masked to make interconnection wiring not visible from the outside) so that the pad 254 is not visible from the outside. According to various embodiments, the pad 254 may be mounted in the electronic device 201 in the state in which the pad 254 is folded.

According to an embodiment, the DDI 255 may be mounted on the pad 254 and may be connected to a FPCB inside the electronic device 201. The DDI 255 may process signals for driving the first display part 251 and the second display part 252. For example, the DDI 255 may process a timing signal, a gate signal, a source signal, and the like for driving the first display part 251 and the second display part 252. The DDI 255 may simultaneously drive the first display part 251 and the second display part 252 by using one operating signal.

According to an embodiment, in the case where the DDI 255 is mounted in the electronic device 201, the DDI 255 may be hidden by the BM area so as not to be visible from the outside, or may be mounted on the back side of the display panel 250 (e.g., the first display part 251) such that the DDI 255 is covered with the display panel 250.

While FIG. 3 illustrates that the pad 254 and the DDI 255 are disposed adjacent to the first display part 251, the present disclosure is not limited thereto. For example, the pad 254 and the DDI 255 may be disposed adjacent to the second display part 252.

Figure 4:
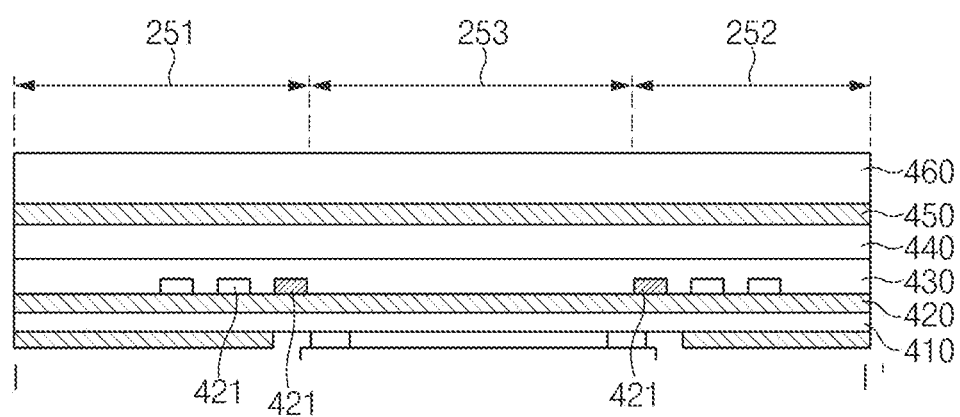
FIG. 4 is a sectional view of a non-active area of a display panel, according to various embodiments of the present disclosure.

FIG. 4 is a sectional view of a non-active area of a display panel, according to various embodiments of the present disclosure. FIG. 4 illustrates a sectional view taken along line I-I' of FIG. 3.

Referring to FIG. 4, the display panel 250 may include a substrate 410, an emissive layer 420, an encapsulation layer 430, a polarizing layer (POL) 440, an adhesive layer 450, and a touch panel 460. FIG. 4 is merely illustrative, and the present disclosure is not limited thereto.

According to an embodiment, the substrate 410 may be of a flexible plastic material. For example, the substrate 410 may be implemented with polyimide (PI). In an embodiment, the substrate 410 may be formed by applying a thin layer of liquid PI to carrier glass and then curing the liquid PI layer.

According to an embodiment, the emissive layer 420 may have a structure in which light-emitting devices (e.g., organic electro luminescence (EL)) 421 are deposited on a thin film transistor (TFT) substrate. The emissive layer 420 may emit light in response to an electrical signal. The TFT substrate may include TFTs for driving respective pixels in an active area, metal interconnections, insulation films, or the like. The organic EL may emit light if holes and electrons are injected into the organic EL from a cathode and an anode.

According to various embodiments, the emissive layer 420 of the first and second display parts 251 and 252 may include the light emitting devices 421. The emissive layer 420 of the third display part 253 may include no separate light-emitting device. A portion of the third display part 253 may be hidden by the first side bezel 231 disposed on the first side surface C, as in FIG. 2. Even though the third display part 253 outputs contents, the contents are not visible to a user's eyes. The third display part 253 may transmit signals for driving the first display part 251 and the second display part 252.

According to various embodiments, the encapsulation layer (thin film encapsulation (TFE)) 430 may include organic layers and inorganic layers alternately laminated on the emissive layer 420 to protect the light-emitting devices 421 from oxygen or moisture. The POL 440 may make light emitted from the emissive layer 420 clearer than light reflected from the outside. The adhesive layer 450 may stick the touch panel 460 to the POL 440. The adhesive layer 450 may be implemented with, for example, an optical clean adhesive (OCA) film (a double-sided adhesive tape). The touch panel 460 may recognize a user's touch. The touch panel 460 may be implemented with an Indium-Tin-Oxide (ITO) film or a metal mesh.

Figure 5:
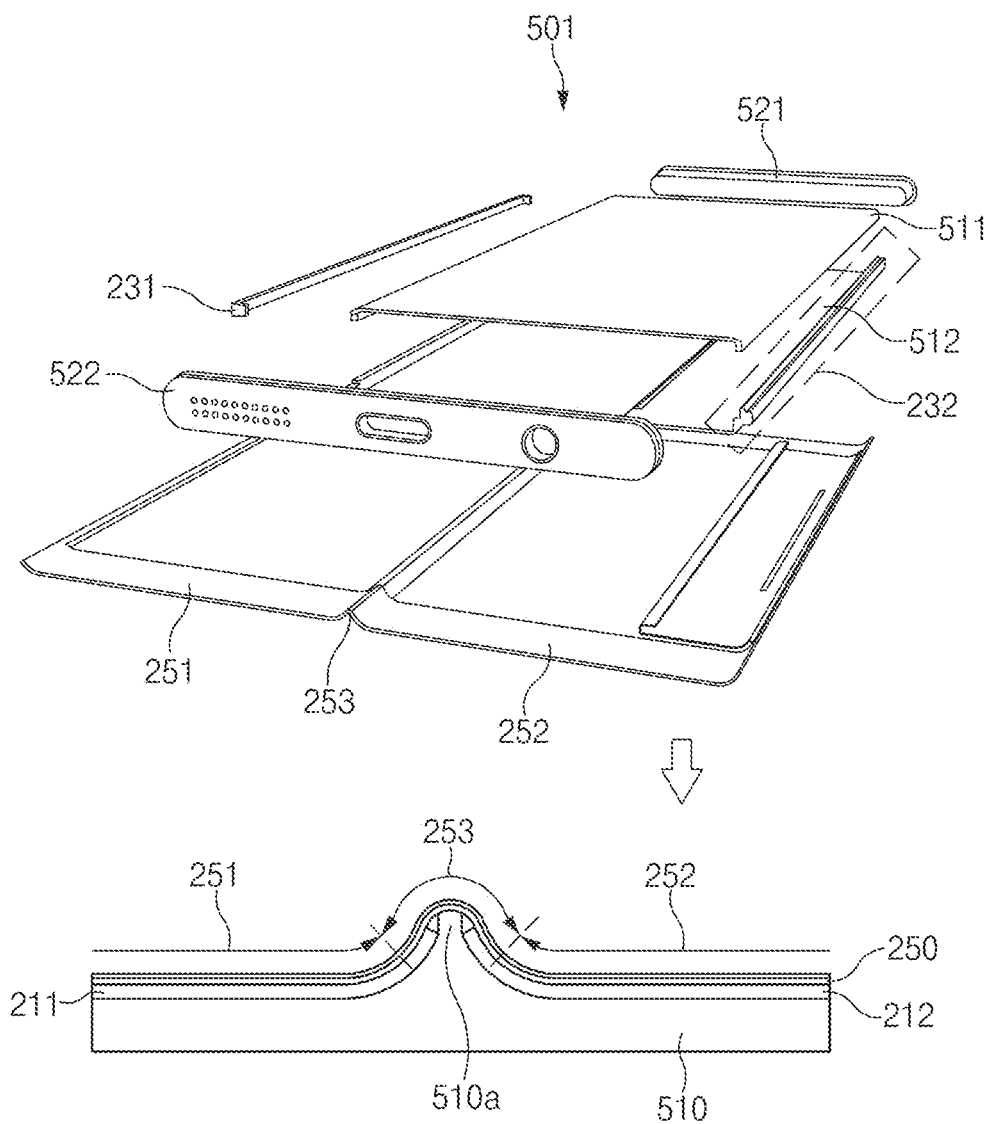
FIG. 5 illustrates a development view of an electronic device and an example of an operation of manufacturing a display panel, according to various embodiments of the present disclosure.

FIG. 5 illustrates a development view of an electronic device and an example of an operation of manufacturing a display panel, according to various embodiments of the present disclosure. FIG. 5 is merely illustrative, and the present disclosure is not limited thereto. An electronic device 501 may be any one of the first to fourth electronic devices 101 to 104 illustrated in FIGS. 1A to 1D and the electronic device 201 illustrated in FIG. 2.

Referring to FIG. 5, the electronic device 501 may include the display panel 250, inner housings 511 and 512, and upper and lower housings 521 and 522. FIG. 5 focuses on the housings 511, 512, 521, and 522 and the display panel 250 of the electronic device 501. However, the electronic device 501 may further include additional elements (e.g., a button, an internal circuit, a printed circuit board (PCB), and the like).

According to an embodiment, at least a part of the display panel 250 may have a curved or flexible form. The display panel 250 may include the first display part 251, the second display part 252, and the third display part 253. The display panel 250 may be bent to surround the inner housings 511 and 512 in the state in which the display panel 250 is unfolded as illustrated in FIG. 5. For example, the first display part 251 and the second display part 252 arranged to face the same direction (or arranged in the same plane) may be changed into a state in which the first and second display parts 251 and 252 face opposite directions.

According to an embodiment, the third display part 253 may be disposed between the first display part 251 and the second display part 252. The third display part 253 may be an area incapable of outputting contents, such as an image, text, or the like, or may be an area where the output of contents is restricted.

According to an embodiment, the DDI 255 may be connected to one side surface of the display panel 250. The DDI 255 may provide signals for driving the display panel 250. The DDI 255 may be mounted on the second side bezel 232 (or a support part) formed on a side of the second inner housing 512.

According to various embodiments, the display panel 250 and the window covers 211 and 212 may be manufactured by using a jig 510 of lamination equipment. For example, the first window cover 211 may be mounted on a first side of the jig 510 with respect to a center 510a of the jig 510. The second window cover 212 may be mounted on a second side of the jig 510 with respect to the center 510a of the jig 510.

According to an embodiment, the display panel 250 may have a curved or flexible form. The display panel 250 may be mounted on the first window cover 211 and the second window cover 212. The first display part 251 of the display panel 250 may be mounted on the first window cover 211. The second display part 252 of the display panel 250 may be mounted on the second window cover 212. The third display part 253 of the display panel 250 may be mounted on the center 510a of the jig 510. Through a lamination process, the first window cover 211 may be stuck to the first display part 251, and the second window cover 212 may be stuck to the second display part 252.

According to an embodiment, the inner housings 511 and 512 may be surrounded by the display panel 250. The inner housings 511 and 512 may fix and support the display panel 250. Space may be formed between the inner housings 511 and 512. Elements, such as a PCB, a battery, and the like, may be mounted in the space.

According to an embodiment, a portion of one of the inner housings 511 and 512 may be exposed to the outside to form the second side bezel 232. While FIG. 5 illustrates that a portion of the second inner housing 512 is exposed to the outside, the present disclosure is not limited thereto. For example, a portion of the first inner housing 511 may be exposed to the outside. A mounting area on which the DDI 255 is mounted may be formed adjacent to the second side bezel 232.

According to an embodiment, the first side bezel 231 may be disposed on the opposite side to the second side bezel 232. The first side bezel 231 may be implemented with a separate material separated from the inner housings 511 and 512. When viewed from the outside, the first side bezel 231 may appear to overlap the third display part 253 of the display panel 250. The first side bezel 231 may cover at least a portion of the third display part 253 of the display panel 250 so that the portion is not visible from the outside.

According to an embodiment, the upper and lower housings 521 and 522 may be arranged in a direction perpendicular to the first side bezel 231 or the second side bezel 232. The upper and lower housings 521 and 522 may be surrounded by the display panel 250 and then coupled to the inner housings 511 and 512. The upper and lower housings 521 and 522 may couple and fix the inner housings 511 and 512, the display panel 250, and the window covers 211 and 212.

FIGS. 6A to 6E illustrate an assembly process for an electronic device, according to various embodiments of the present disclosure.

Figure 6A:
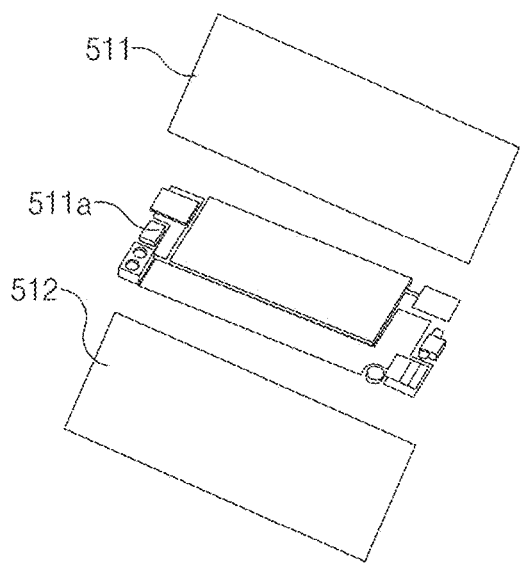
FIGS. 6A, 6B, 6C, 6D, and 6E illustrate an assembly process for an electronic device, according to various embodiments of the present disclosure.

Referring to FIG. 6A, the inner housings 511 and 512 may be combined together to contain internal elements 511a (e.g., a PCB, a battery, and the like). A portion of the inner housing 511 or 512 may be exposed to the outside. The first window cover 211 and the second window cover 212 may be stuck to the display panel 250, as illustrated in FIG. 5.

Figure 6D:
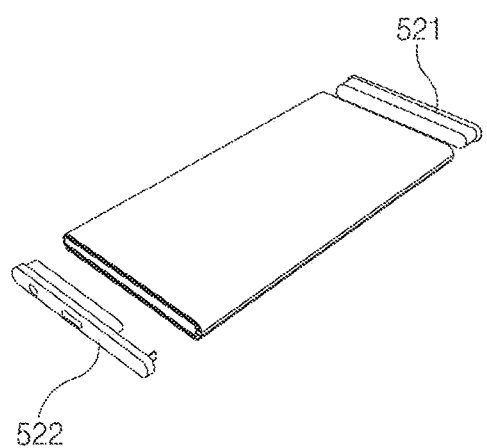
Figure 6B:
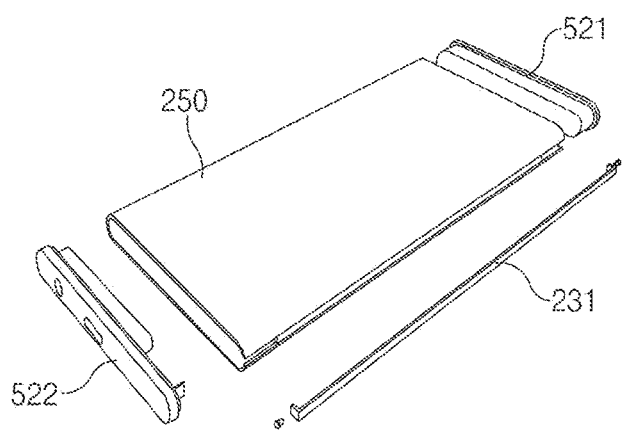

Referring to FIG. 6B, the display panel 250 (including the window covers 211 and 212 and a touch panel) may be mounted to surround the inner housings 511 and 512.

Figure 6E:
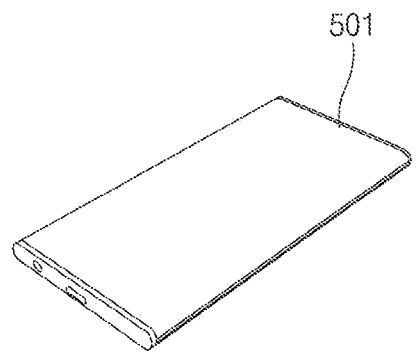
Figure 6C:
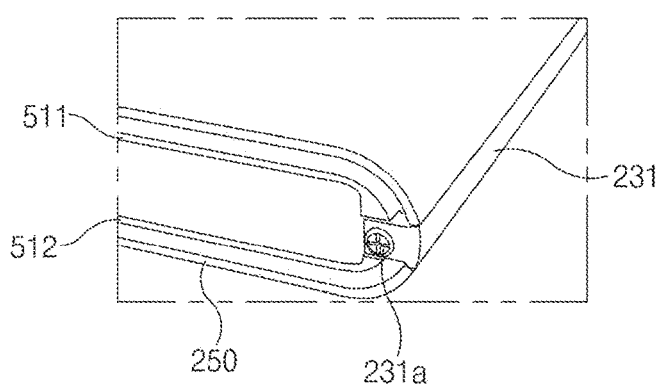

Referring to FIG. 6C, the first side bezel 231 may be coupled between a first end surface and a second end surface of the display panel 250. According to various embodiments, the first side bezel 231 may be fixed by a coupling part 231a.

Referring to FIGS. 6D and 6E, the upper and lower housings 521 and 522 may form the top and bottom of the electronic device 501 after the inner housings 511 and 512, the display panel 250, and the first side bezel 231 are coupled together.

Figure 7:
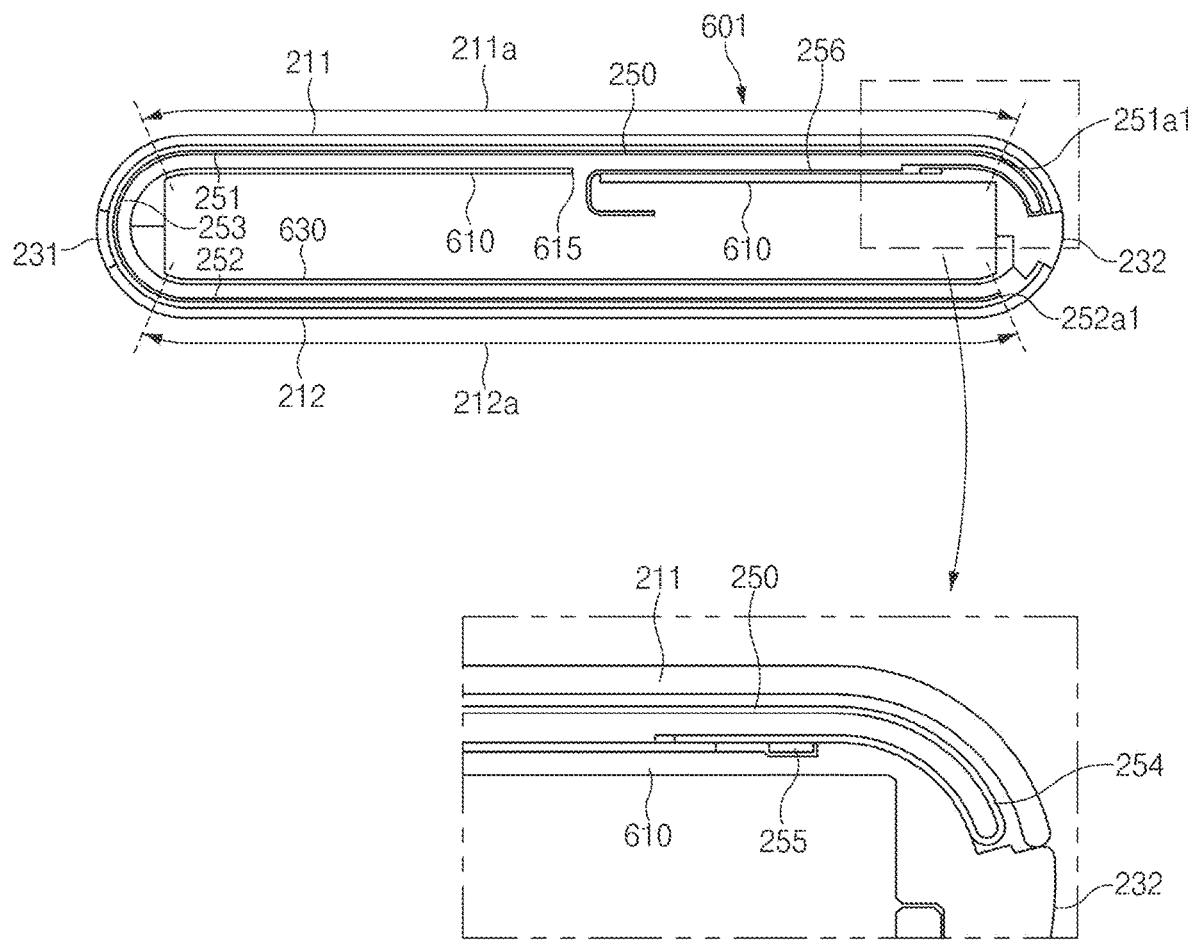
FIG. 7 illustrates a housing structure inward of a display panel, according to various embodiments of the present disclosure.

FIG. 7 illustrates a housing structure inward of a display panel, according to various embodiments of the present disclosure. FIG. 7 is merely illustrative, and the present disclosure is not limited thereto. An electronic device 601 may be any one of the first to fourth electronic devices 101 to 104 illustrated in FIGS. 1A to 1D and the electronic device 201 illustrated in FIG. 2.

Referring to FIG. 7, the electronic device 601 may include the first window cover 211, the second window cover 212, the first side bezel 231, the second side bezel 232, and the display panel 250.

According to an embodiment, the inside of the display panel 250 may be supported by a housing structure. While FIG. 7 illustrates that the display panel 250 is supported by first and second housing structures 610 and 630, the present disclosure is not limited thereto. The first housing structure 610 may support the first window cover 211 and the first display part 251 of the display panel 250.

According to an embodiment, the first housing structure 610 may fix a portion of the first display part 251 and a portion of the third display part 253. The first housing structure 610 may be coupled with the second housing structure 630 at a position adjacent to the third display part 253. The first housing structure 610 may support the pad 254 connected to the distal end 251a1 of the first display part 251, the DDI 255, and a FPCB 256.

According to an embodiment, the pad 254 may be connected to the distal end 251a1 of the first display part 251. The pad 254 may be mounted on the first housing structure 610 in the state in which the pad 254 is folded toward the inside of the electronic device 601.

According to an embodiment, portions of the first and second display parts 251 and 252 adjacent to the second side bezel 232 may be curved outwards to form a side edge region.

According to an embodiment, the display panel 250 may be mounted on the first housing structure 610 in the state in which an inactive (non-active) area (or an interconnection wiring area or a pad for interconnection wiring) is folded toward the inside of the electronic device 601 one or more times after the display panel 250 is bonded with the FPCB 256 through anisotropic conductive film (ACF) bonding.

According to an embodiment, the DDI 255 may be connected to the FPCB 256. The DDI 255 may be disposed to overlap the back side (or inner surface) of the first display part 251. The FPCB 256 may be connected with a main PCB inside the electronic device 601 through a slot 615 of the first housing structure 610.

According to various embodiments, a portion of the first housing structure 610 may be exposed outside the electronic device 201 to form the second side bezel 232. The second side bezel 232 may be implemented with a material that is the same as, or similar to, that of the first side bezel 231.

According to an embodiment, the second housing structure 630 may support the second window cover 212 and the second display part 252 of the display panel 250. The second housing structure 630 may be coupled with the first housing structure 610 at a position adjacent to the first side bezel 231 and at a position adjacent to the second side bezel 232.

Figure 8:
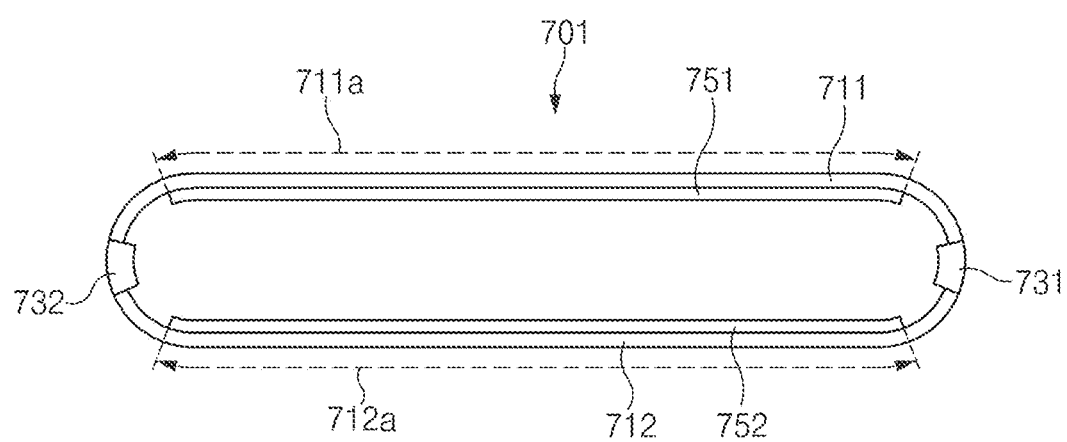
FIG. 8 is a sectional view of an electronic device including a plurality of display panels, according to various embodiments of the present disclosure.

FIG. 8 is a sectional view of an electronic device including a plurality of display panels, according to various embodiments of the present disclosure. An electronic device 701 may be any one of the first to fourth electronic devices 101 to 104 illustrated in FIGS. 1A to 1D and the electronic device 201 illustrated in FIG. 2.

Referring to FIG. 8, the electronic device 701 may include a first window cover 711, a second window cover 712, a first side bezel 731, a second side bezel 732, a first display panel 751, and a second display panel 752.

Functions and shapes of the first and second window covers 711 and 712 may be the same as, or similar to, the functions and shapes of the first and second window covers 211 and 212 in FIG. 2.

The first side bezel 731 and the second side bezel 732 may fix or separate the first window cover 711 and the second window cover 712. The first side bezel 731 may have the same shape as, a shape similar to, that of the second side bezel 732. The first side bezel 731 may be implemented with the same material as, or a material similar to, that of the second side bezel 732.

According to various embodiments, the first side bezel 731 and the second side bezel 732 may be a part extending from a housing inside the electronic device 701 to the outside, or may be a separate structure attached to the extending part of the housing.

According to various embodiments, the first side bezel 731 and the second side bezel 732 may include a metal material. The first side bezel 731 and the second side bezel 732 may be used as an antenna radiator that transmits and receives a specified frequency signal.

According to various embodiments, a FPCB and a DDI used for driving one of the first and second display panels 751 and 752 may be disposed adjacent to the first side bezel 731. A FPCB and a DDI used for driving the other of the first and second display panels 751 and 752 may be disposed adjacent to the second side bezel 732.

According to various embodiments, the first display panel 751 may form a first active area 711a. The first display panel 751 may output contents, such as an image, text, or the like, through a first surface of the electronic device 701 that faces a first direction. The first display panel 751 may be brought into close contact with an inner surface of the first window cover 711.

According to various embodiments, the second display panel 752 may form a second active area 712a. The second display panel 752 may output contents, such as an image, text, or the like, through a second surface of the electronic device 701 that faces a second direction opposite to the first direction. The second display panel 752 may be brought into close contact with an inner surface of the second window cover 712.

According to various embodiments, the first display panel 751 and the second display panel 752 may be driven by different DDIs. Furthermore, the first display panel 751 and the second display panel 752 may output contents in response to mutually independent signals. For example, the first display panel 751 may operate in response to a timing signal, a gate signal, and a source signal of a first DDI. The second display panel 752 may operate in response to a timing signal, a gate signal, and a source signal of a second DDI.

Figure 9:
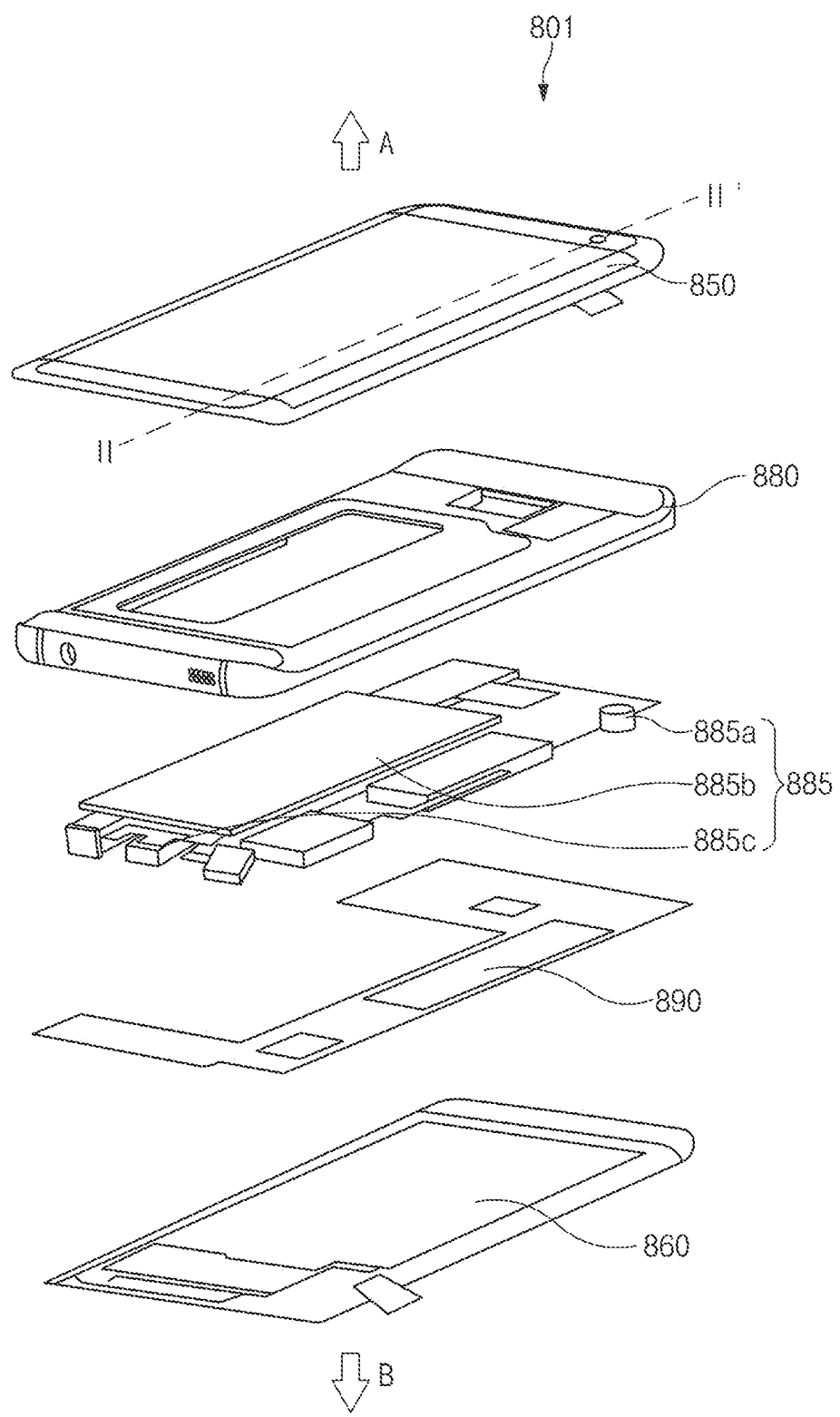
FIG. 9 illustrates an internal configuration of an electronic device according to various embodiments of the present disclosure.

FIG. 9 illustrates an internal configuration of an electronic device according to various embodiments of the present disclosure. An electronic device 801 may be any one of the first to fourth electronic devices 101 to 104 illustrated in FIGS. 1A to 1D and the electronic device 201 illustrated in FIG. 2.

Referring to FIG. 9, the electronic device 801 may include a first display panel 850 (including a window cover) and a second display panel 860. The first display panel 850 may be arranged to face a first direction (e.g., the direction of arrow A) to output contents in the first direction. The second display panel 860 may be arranged to face a second direction (e.g., the direction of arrow B), which is opposite to the first direction, to output contents in the second direction. According to an embodiment, the first display panel 850 may be disposed together with a sensor window, a camera lens, or the like.

According to various embodiments, a first housing 880, an internal circuit 885, and a second housing 890 may be disposed between the first display panel 850 and the second display panel 860. The first housing 880 may fix the first display panel 850. The second housing 890 may fix the second display panel 860. The internal circuit 885 may include various circuits and modules, such as a camera module 885a, a battery 885b, a charging terminal 885c, a PCB, and the like, for operating the electronic device 801.

Figure 10:
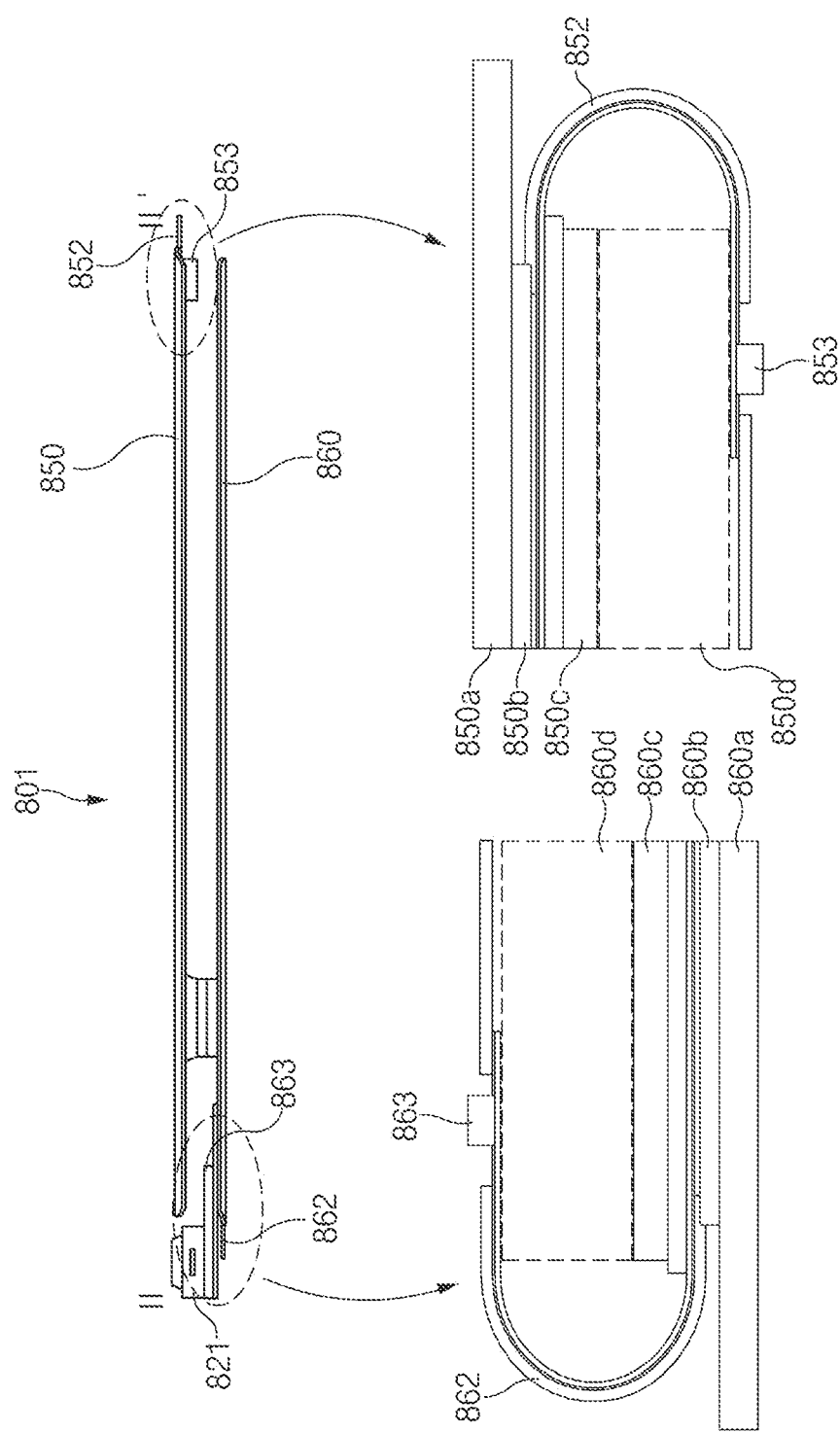
FIG. 10 is a sectional view for explaining mounting of a display driver IC (DDI) using an internal module, according to various embodiments of the present disclosure.

FIG. 10 is a sectional view for explaining mounting of a DDI using an internal module, according to various embodiments of the present disclosure. FIG. 10 illustrates a sectional view taken along line II-IF of FIG. 9.

Referring to FIG. 10, according to various embodiments, the first display panel 850 may be driven by a first pad 852 and a first DDI 853. The first pad 852 and the first DDI 853 may be disposed adjacent to the upper (or lower) end of the electronic device 801.

According to various embodiments, the first pad 852 may be connected with one end of the first display panel 850 through an interconnection wire and may be folded toward the inside of the electronic device 801. The first DDI 853 may be connected to the first pad 852. The first DDI 853 may be disposed to overlap the back side (or inner surface) of the first display panel 850.

According to various embodiments, a window cover 850a may be attached to an outer surface of the first display panel 850. The window cover 850a may cover an area larger than an active area of the first display panel 850. The first display panel 850 may include a plurality of layers 850b therein (e.g., a substrate, an emissive layer, an encapsulation layer, a POL, an adhesive layer, a touch panel, and the like) for outputting contents. The first display panel 850 may be supported by a buffer part 850c and an inner housing 850d.

According to various embodiments, the first pad 852 may be bent to form a curved surface along a side surface of the buffer part 850c and a side surface of the inner housing 850d. The first DDI 853 may be connected to the first pad 852. The first DDI 853 may be disposed to overlap the back side (or inner surface) of the first display panel 850.

According to various embodiments, the second display panel 860 may be driven by a second pad 862 and a second DDI 863. The second pad 862 and the second DDI 863 may be disposed adjacent to the lower (or upper) end of the electronic device 801.

According to various embodiments, the second pad (or film) 862 may be connected with one end of the second display panel 860 through an interconnection wire. The second pad 862 may be folded toward the inside of the electronic device 801. The folded portion of the second pad 862 may be brought into close contact with the back side of a camera module 821. The second DDI 863 may be connected to the second pad 862. The second DDI 863 may be disposed to overlap the back side (or inner surface) of the second display panel 860.

According to various embodiments, a window cover 860a may be attached to an outer surface of the second display panel 860. The window cover 860a may cover an area larger than an active area of the second display panel 860. The second display panel 860 may include a plurality of layers 860b therein (e.g., a substrate, an emissive layer, an encapsulation layer, a POL, an adhesive layer, a touch panel, and the like) for outputting contents. The second display panel 860 may be supported by a buffer part 860c and an inner housing 860d.

According to various embodiments, the second pad 862 may be bent to form a curved surface along a side surface of the buffer part 860c and a side surface of the inner housing 860d. The second DDI 863 may be connected to the second pad 862. The second DDI 863 may be disposed to overlap the back side (or inner surface) of the second display panel 860.

Figure 11:
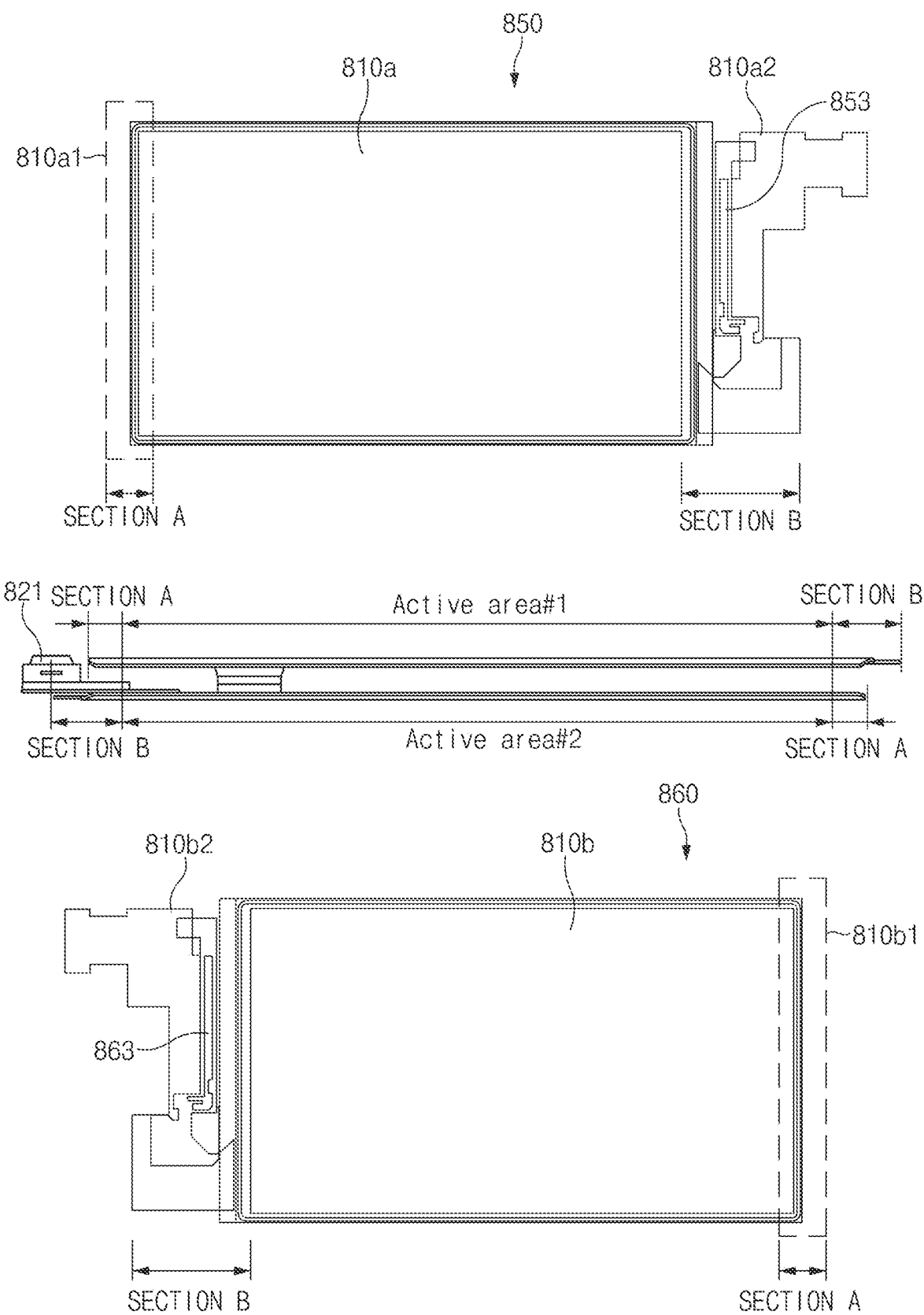
FIG. 11 illustrates a camera module formed on a front surface of an electronic device and an internal structure of a display panel, according to various embodiments of the present disclosure.

FIG. 11 illustrates a camera module formed on a front surface of an electronic device and an internal structure of a display panel, according to various embodiments of the present disclosure.

Referring to FIG. 11, a first surface of the electronic device 801 may include a first active area 810a, a first inactive (non-active) area 810a1, and a second inactive (non-active) area 810a2.

According to various embodiments, the first display panel 850 may have the first active area 810a of a rectangular shape, and an inactive (non-active) area for driving the first display panel 850 may be disposed near the first active area 810a. The inactive (non-active) area may include the first inactive (non-active) area 810a1 for simple interconnection wiring and the second inactive (non-active) area 810a2 for connection of a FPCB for driving the first display panel 850. The first inactive (non-active) area 810a1 may have a different size than the second inactive (non-active) area 810a2.

According to various embodiments, chips, such as the first DDI 853, may be disposed in the second inactive (non-active) area 810a2. The second inactive (non-active) area 810a2 may be mounted in a shape in which the second inactive (non-active) area 810a2 is folded toward the inside of the electronic device 801 one or more times.

According to various embodiments, a second surface of the electronic device 801 may include a second active area 810b, a first inactive (non-active) area 810b1, and a second inactive (non-active) area 810b2.

According to various embodiments, the second display panel 860 may have the second active area 810b of a rectangular shape, and an inactive (non-active) area for driving the second display panel 860 may be disposed near the second active area 810b. The inactive (non-active) area may include the first inactive (non-active) area 810b1 for simple interconnection wiring and the second inactive (non-active) area 810b2 for connection of a FPCB for driving the second display panel 860. The first inactive (non-active) area 810b1 may have a different size than the second inactive (non-active) area 810b2.

According to various embodiments, chips, such as the second DDI 863, may be disposed in the second inactive (non-active) area 810b2. The second inactive (non-active) area 810b2 may be mounted in a shape in which the second inactive (non-active) area 810b2 is folded toward the inside of the electronic device 801 one or more times. According to an embodiment, the second inactive (non-active) area 810b2 of the second display panel 860 may be hidden behind the nearby camera module 821.

According to various embodiments, the first active area 810a of the first display panel 850 and the second active area 810b of the second display panel 860 may have substantially the same size and may be disposed to be symmetric to each other.

In an embodiment, the second inactive (non-active) area 810b2 of the second display panel 860 may be folded behind the nearby camera module 821 to correspond to the width of the first inactive (non-active) area 810a1 of the first display panel 850 (that is, such that starting points of the active areas 810a and 810b match each other).

Figure 12:
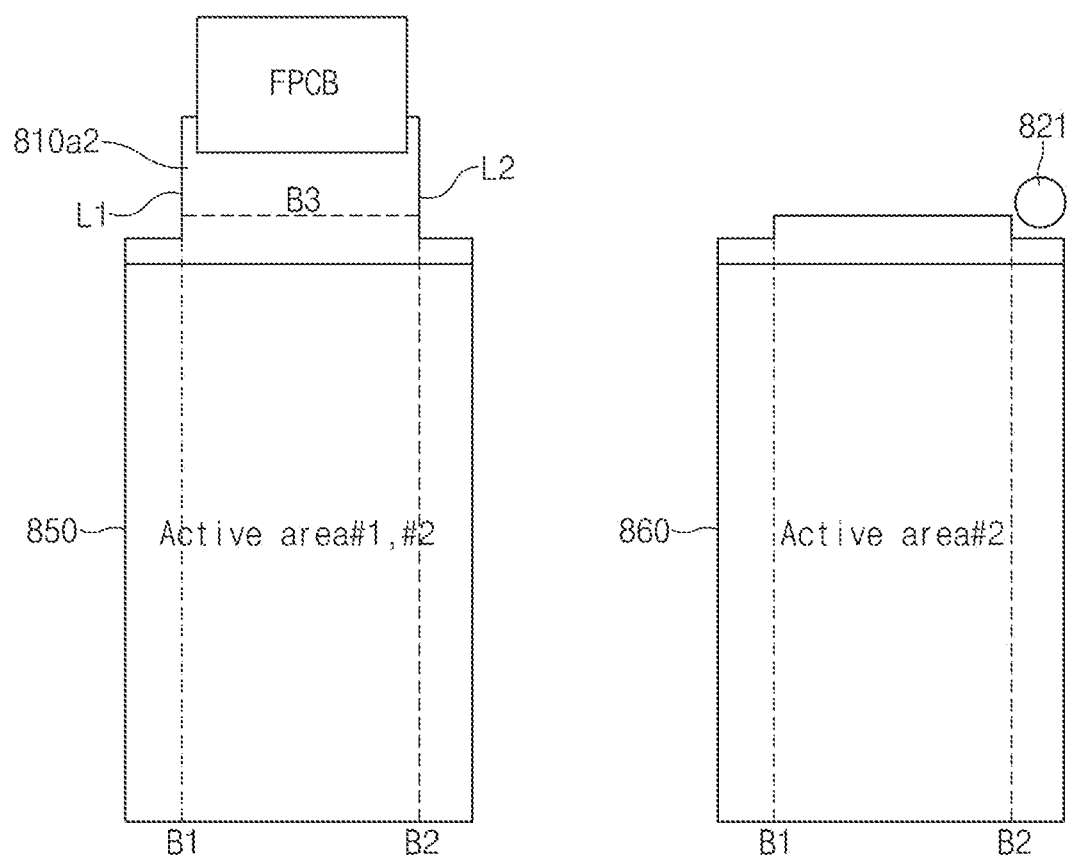
FIG. 12 illustrates a shape of an inactive (non-active) area of a display panel, according to various embodiments of the present disclosure.

FIG. 12 illustrates a shape of an inactive (non-active) area of a display panel, according to various embodiments of the present disclosure.

Referring to FIG. 12, the second inactive (non-active) area 810a2 may be formed on one surface of the first display panel 850. Chips, such as the first DDI 853, may be disposed in the second inactive (non-active) area 810a2.

According to various embodiments, the second inactive (non-active) area 810a2 may include L-cut regions L1 and L2. The L-cut regions L1 and L2 may be formed outward of bending lines B1, B2, and B3 along which the first display panel 850 is bent or folded. The L-cut regions L1 and L2 may ensure space in which the camera module 821 is mounted. In the case where the first display panel 850 extends to a side of the electronic device 801, the first display panel 850 may be bent without overlap by virtue of the L-cut regions L1 and L2.

According to various embodiments, a portion (an L-cut portion) of the second inactive (non-active) area 810b2 of the second display panel 860 may surround the nearby camera module 821.

Figure 13:
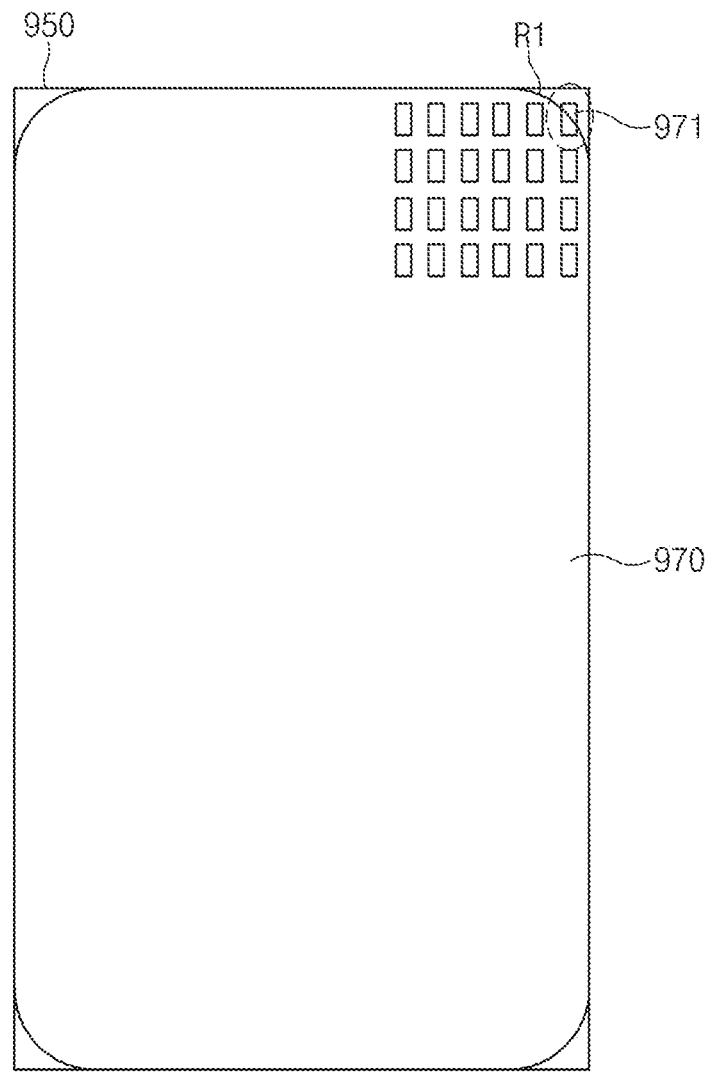
FIG. 13 illustrates an active area having round corners, according to various embodiments of the present disclosure.

FIG. 13 illustrates an active area having round corners, according to various embodiments of the present disclosure.

Referring to FIG. 13, a display panel 950 may include an active area 970. The active area 970 may be an area for outputting contents by using light-emitting devices. According to various embodiments, the active area 970 may have round corners with a curved surface R1.

According to an embodiment, the display panel 950 may have round corners with a curved surface. The active area 970 may be implemented in a curved shape according to the shape of the display panel 950.

According to an embodiment, the display panel 950 may have a rectangular shape. The display panel 950 may have right-angled corners. The active area 970 may have round corners with a curved surface. In this case, the active area 970 may be implemented in a form in which a light-emitting device 971 located on the curved surface R1 of a round corner is removed, or in a form in which the light-emitting device 971 located on the curved surface R1 of the round corner is maintained in a turned-off state so that a user is incapable of recognizing the light-emitting-device 971.

According to various embodiments, in the case where the light-emitting device 971 located on the curved surface R1 is maintained in a turned-off state, the light-emitting device 971 may be used to provide an indication signal (e.g., indication of an incoming message, indication of a missed call, or the like) to a user.

Figure 14:
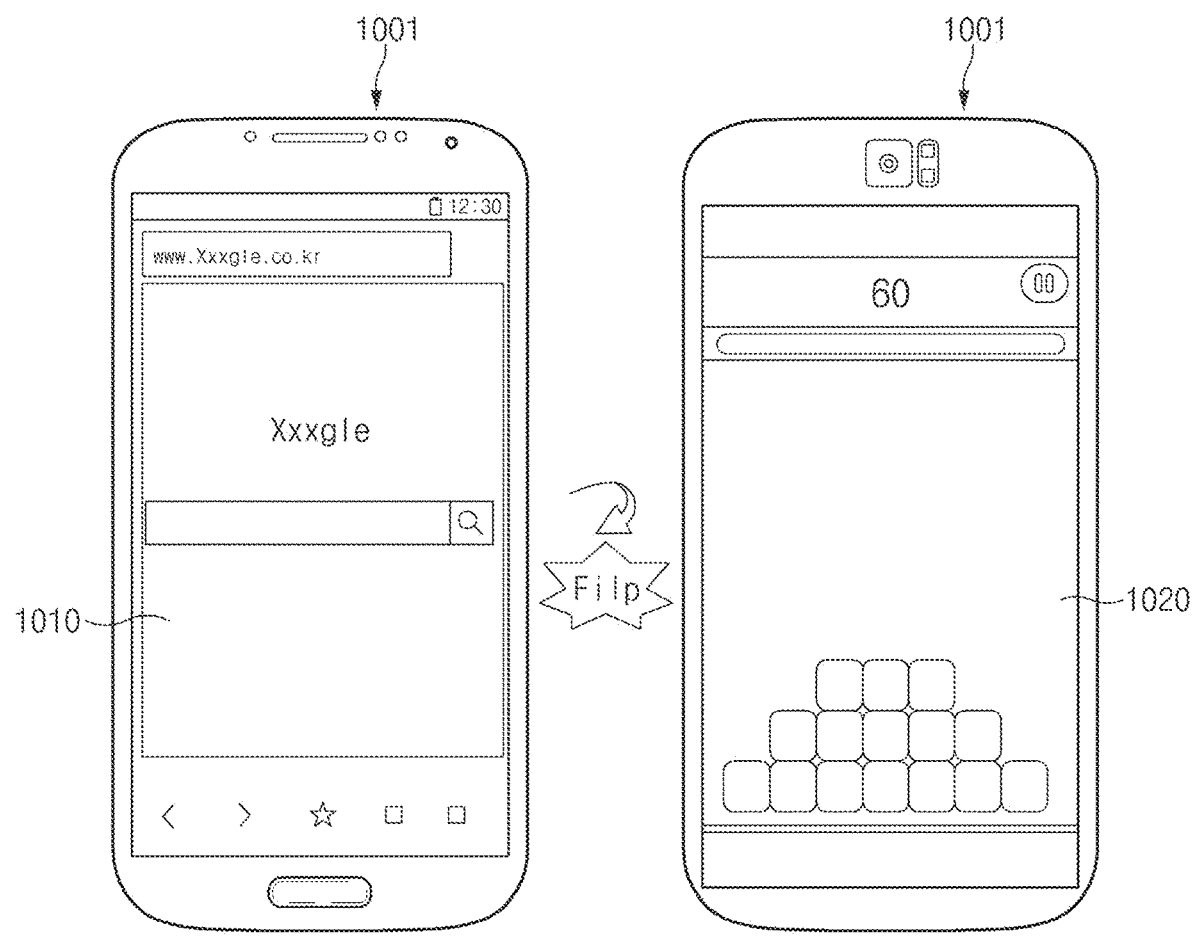
FIG. 14 illustrates an example of using a multi-display, according to various embodiments of the present disclosure.

FIG. 14 illustrates an example of using a multi-display, according to various embodiments of the present disclosure.

Referring to FIG. 14, an electronic device 1001 may include at least one display (e.g., a first display 1010 and a second display 1020).

According to an embodiment, the first display 1010 and the second display 1020 may be implemented with a single display panel and may be driven by a single DDI.

According to an embodiment, the first display 1010 and the second display 1020 may be implemented with different display panels, respectively, and may be driven by separate signals of different DDIs.

According to various embodiments, the first display 1010 and the second display 1020 may output different applications, respectively. For example, the first display 1010 may output a screen of an Internet search application, and the second display 1020 may output a screen of a game application.

According to various embodiments, the first display 1010 and the second display 1020 may output different windows (or activities) of the same application, respectively. For example, the first display 1010 may output a chat with a first user in a message application, and the second display 1020 may output a chat with a second user in the same message application.

The electronic device 1001 may output contents, including text or an image, in various manners, in addition to the above-described embodiment. A user may view a relatively large amount of contents at the same time by using the multi-display.

Figure 15:
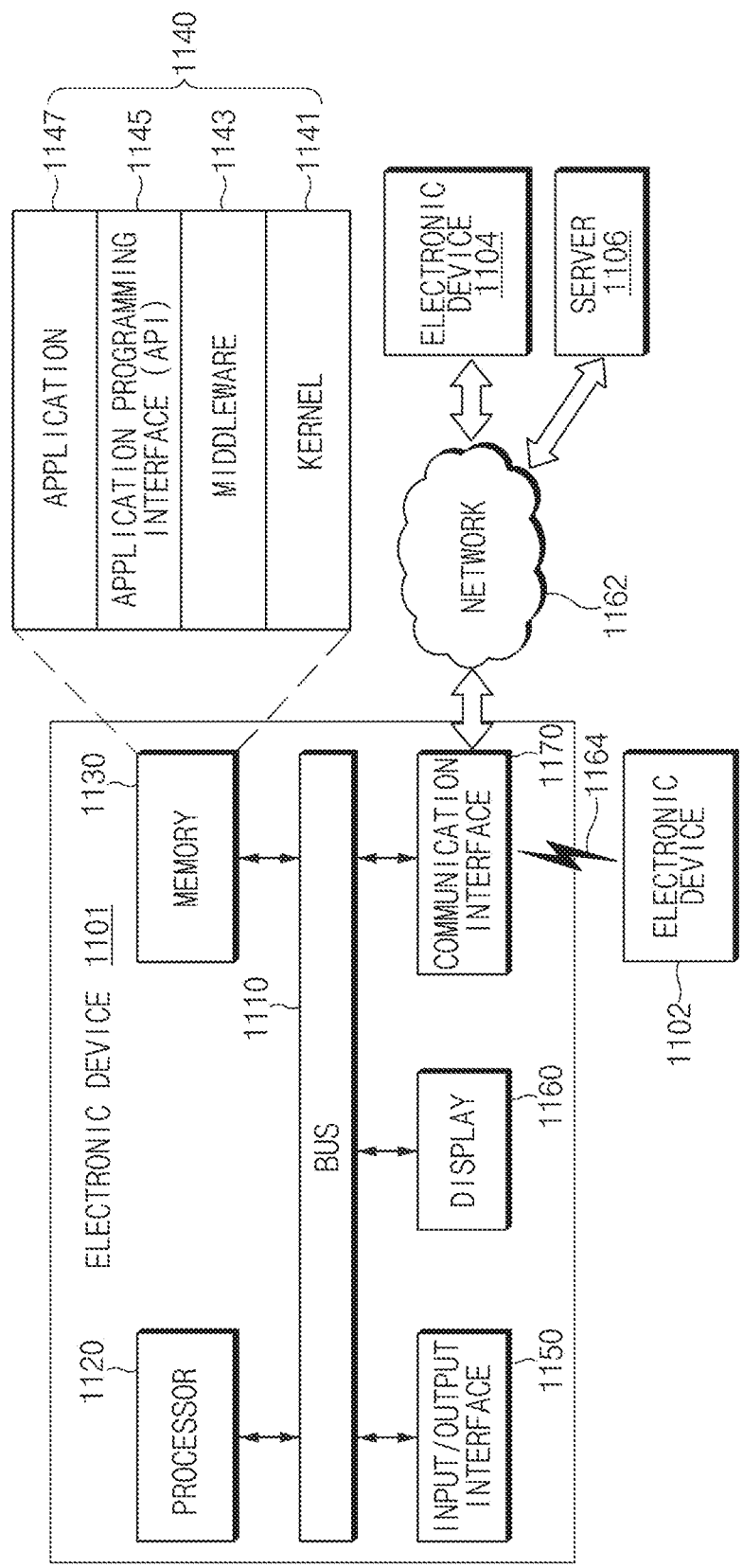
FIG. 15 illustrates an electronic device in a network environment according to various embodiments of the present disclosure.

FIG. 15 illustrates an electronic device in a network environment according to an embodiment of the present disclosure of the present disclosure.

An electronic device 1101 in a network environment 1100 according to various embodiments of the present disclosure will be described with reference to FIG. 15. The electronic device 1101 may include a bus 1110, a processor 1120, a memory 1130, an input/output interface 1150, a display 1160, and a communication interface 1170. In various embodiments of the present disclosure, at least one of the foregoing elements may be omitted or another element may be added to the electronic device 1101.

The bus 1110 may include a circuit for connecting the above-mentioned elements 1110 to 1170 to each other and transferring communications (e.g., control messages and/or data) among the above-mentioned elements.

The processor 1120 may include at least one of a CPU, an AP, or a communication processor (CP). The processor 1120 may perform data processing or an operation related to communication and/or control of at least one of the other elements of the electronic device 1101.

The memory 1130 may include a volatile memory and/or a nonvolatile memory. The memory 1130 may store instructions or data related to at least one of the other elements of the electronic device 1101. According to an embodiment of the present disclosure, the memory 1130 may store software and/or a program 1140. The program 1140 may include, for example, a kernel 1141, a middleware 1143, an application programming interface (API) 1145, and/or an application program (or an application) 1147. At least a portion of the kernel 1141, the middleware 1143, or the API 1145 may be referred to as an operating system (OS).

The kernel 1141 may control or manage system resources (e.g., the bus 1110, the processor 1120, the memory 1130, or the like) used to perform operations or functions of other programs (e.g., the middleware 1143, the API 1145, or the application program 1147). Furthermore, the kernel 1141 may provide an interface for allowing the middleware 1143, the API 1145, or the application program 1147 to access individual elements of the electronic device 1101 in order to control or manage the system resources.

The middleware 1143 may serve as an intermediary so that the API 1145 or the application program 1147 communicates and exchanges data with the kernel 1141.

Furthermore, the middleware 1143 may handle one or more task requests received from the application program 1147 according to a priority order. For example, the middleware 1143 may assign at least one application program 1147 a priority for using the system resources (e.g., the bus 1110, the processor 1120, the memory 1130, or the like) of the electronic device 1101. For example, the middleware 1143 may handle the one or more task requests according to the priority assigned to the at least one application, thereby performing scheduling or load balancing with respect to the one or more task requests.

The API 1145, which is an interface for allowing the application 1147 to control a function provided by the kernel 1141 or the middleware 1143, may include, for example, at least one interface or function (e.g., instructions) for file control, window control, image processing, character control, or the like.

The input/output interface 1150 may serve to transfer an instruction or data input from a user or another external device to (an)other element(s) of the electronic device 1101. Furthermore, the input/output interface 1150 may output instructions or data received from (an)other element(s) of the electronic device 1101 to the user or another external device.

The display 1160 may include, for example, a liquid crystal display (LCD), a light-emitting diode (LED) display, an organic light-emitting diode (OLED) display, a microelectromechanical systems (MEMS) display, or an electronic paper display. The display 1160 may present various content (e.g., a text, an image, a video, an icon, a symbol, or the like) to the user. The display 1160 may include a touch screen, and may receive a touch, gesture, proximity or hovering input from an electronic pen or a part of a body of the user.

The communication interface 1170 may set communications between the electronic device 1101 and an external device (e.g., a first external electronic device 1102, a second external electronic device 1104, or a server 1106). For example, the communication interface 1170 may be connected to a network 1162 via wireless communications or wired communications so as to communicate with the external device (e.g., the second external electronic device 1104 or the server 1106).

The wireless communications may employ at least one of cellular communication protocols such as long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1164. The short-range communications may include at least one of wireless fidelity (Wi-Fi), Bluetooth (BT), near field communication (NFC), magnetic stripe transmission (MST), or GNSS.

The MST may generate pulses according to transmission data and the pulses may generate electromagnetic signals. The electronic device 1101 may transmit the electromagnetic signals to a reader device such as a POS device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 1162 may include at least one of telecommunications networks, for example, a computer network (e.g., local area network (LAN) or wide area network (WAN)), the Internet, or a telephone network.

The types of the first external electronic device 1102 and the second external electronic device 1104 may be the same as or different from the type of the electronic device 1101. According to an embodiment of the present disclosure, the server 1106 may include a group of one or more servers. A portion or all of operations performed in the electronic device 1101 may be performed in one or more other electronic devices (e.g., the first electronic device 1102, the second external electronic device 1104, or the server 1106). When the electronic device 1101 should perform a certain function or service automatically or in response to a request, the electronic device 1101 may request at least a portion of functions related to the function or service from another device (e.g., the first electronic device 1102, the second external electronic device 1104, or the server 1106) instead of or in addition to performing the function or service for itself. The other electronic device (e.g., the first electronic device 1102, the second external electronic device 1104, or the server 1106) may perform the requested function or additional function, and may transfer a result of the performance to the electronic device 1101. The electronic device 1101 may use a received result itself or additionally process the received result to provide the requested function or service. To this end, for example, a cloud computing technology, a distributed computing technology, or a client-server computing technology may be used.

Figure 16:
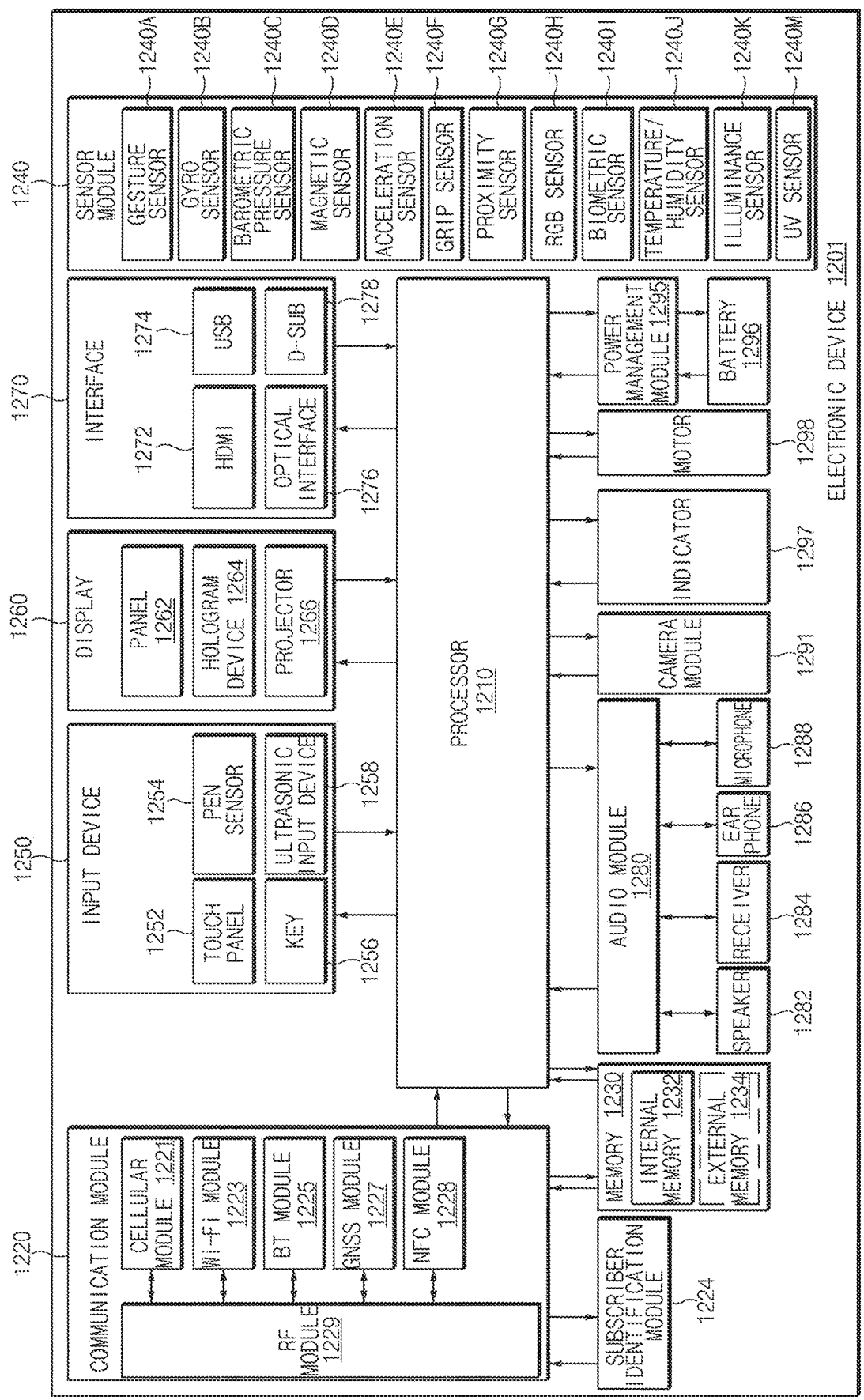
FIG. 16 is a block diagram of an electronic device according to various embodiments of the present disclosure.

FIG. 16 is a block diagram illustrating an electronic device according to an embodiment of the present disclosure.

Referring to FIG. 16, an electronic device 1201 may include, for example, a part or the entirety of the electronic device 1101 illustrated in FIG. 15. The electronic device 1201 may include at least one processor (e.g., AP) 1210, a communication module 1220, a subscriber identification module (SIM) 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an OS or an application program so as to control a plurality of hardware or software elements connected to the processor 1210, and may process various data and perform operations. The processor 1210 may be implemented with, for example, a system on chip (SoC). According to an embodiment of the present disclosure, the processor 1210 may further include a graphics processing unit (GPU) and/or an image signal processor (ISP). The processor 1210 may include at least a portion (e.g., a cellular module 1221) of the elements illustrated in FIG. 16. The processor 1210 may load, on a volatile memory, an instruction or data received from at least one of other elements (e.g., a nonvolatile memory) to process the instruction or data, and may store various data in a nonvolatile memory.

The communication module 1220 may have a configuration that is the same as or similar to that of the communication interface 1170 of FIG. 15. The communication module 1220 may include, for example, a cellular module 1221, a Wi-Fi module 1223, a BT module 1225, a GNSS module 1227 (e.g., a GPS module, a GLONASS module, a BeiDou module, or a Galileo module), a NFC module 1228, and a radio frequency (RF) module 1229.

The cellular module 1221 may provide, for example, a voice call service, a video call service, a text message service, or an Internet service through a communication network. The cellular module 1221 may identify and authenticate the electronic device 1201 in the communication network using the SIM 1224 (e.g., a SIM card). The cellular module 1221 may perform at least a part of functions that may be provided by the processor 1210. The cellular module 1221 may include a CP.

Each of the Wi-Fi module 1223, the BT module 1225, the GNSS module 1227 and the NFC module 1228 may include, for example, a processor for processing data transmitted/received through the modules. According to some various embodiments of the present disclosure, at least a part (e.g., two or more) of the cellular module 1221, the Wi-Fi module 1223, the BT module 1225, the GNSS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1223, the BT module 1225, the GNSS module 1227, or the NFC module 1228 may transmit/receive RF signals through a separate RF module.

The SIM 1224 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1230 (e.g., the memory 1130) may include, for example, an internal memory 1232 or an external memory 1234. The internal memory 1232 may include at least one of a volatile memory (e.g., a dynamic random access memory (RAM) (DRAM), a static RAM (SRAM), a synchronous dynamic RAM (SDRAM), or the like), a nonvolatile memory (e.g., a one-time programmable read only memory (ROM) (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1234 may include a flash drive such as a compact flash (CF), a secure digital (SD), a micro-SD, a mini-SD, an extreme digital (xD), a multimediacard (MMC), a memory stick, or the like. The external memory 1234 may be operatively and/or physically connected to the electronic device 1201 through various interfaces.

The sensor module 1240 may, for example, measure physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a (digital) pen sensor 1254, a key 1256, or an ultrasonic input device 1258. The touch panel 1252 may employ at least one of capacitive, resistive, IR, or UV sensing methods. The touch panel 1252 may further include a control circuit. The touch panel 1252 may further include a tactile layer so as to provide a haptic feedback to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone 1288 so as to identify data corresponding to the ultrasonic waves sensed.

The display 1260 (e.g., the display 1160) may include a panel 1262, a hologram device 1264, or a projector 1266. The panel 1262 may have a configuration that is the same as or similar to that of the display 1160 of FIG. 15. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed in the inside or the outside of the electronic device 1201. According to an embodiment of the present disclosure, the display 1260 may further include a control circuit for controlling the panel 1262, the hologram device 1264, or the projector 1266.

The interface 1270 may include, for example, an HDMI 1272, a USB 1274, an optical interface 1276, or a D-sub-miniature (D-sub) 1278. The interface 1270, for example, may be included in the communication interface 1170 illustrated in FIG. 15. Additionally or alternatively, the interface 1270 may include, for example, a mobile high-definition link (MHL) interface, an SD card/MMC interface, or an infrared data association (IrDA) interface.

The audio module 1280 may convert, for example, a sound into an electrical signal or vice versa. At least a portion of elements of the audio module 1280 may be included in the input/output interface 1150 illustrated in FIG. 15. The audio module 1280 may process sound information input or output through a speaker 1282, a receiver 1284, an earphone 1286, or the microphone 1288.

The camera module 1291 is, for example, a device for shooting a still image or a video. According to an embodiment of the present disclosure, the camera module 1291 may include at least one image sensor (e.g., a front sensor or a rear sensor), a lens, an ISP, or a flash (e.g., an LED or a xenon lamp).

The power management module 1295 may manage power of the electronic device 1201. According to an embodiment of the present disclosure, the power management module 1295 may include a power management integrated circuit (PMIC), a charger IC, or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an n electronic device includes a housing that includes a first surface facing a first direction, a second surface facing a second direction opposite to the first direction, and a side surface surrounding space between the first surface and the second surface, a display that includes a first display part, a second display part, and a third display part, and at least one DDI disposed inside the housing and electrically connected to the display, wherein the first display part includes a first active area exposed through at least a portion of the first surface, wherein the second display part includes a second active area exposed through at least a portion of the second surface, and wherein the third display part is curved along a portion of the side surface from the first display part to the second display part and includes at least one optically transparent layer.

According to various embodiments, each of the first and second display parts includes an emissive layer, a touch panel, and at least one optically transparent layer, and at least a portion of the third display part does not include a light-emitting device.

According to various embodiments, the at least one DDI includes a first driver IC electrically connected to the first active area and a second driver IC electrically connected to the second active area. The first driver IC and the second driver IC are disposed so as not to overlap each other when viewed from the first surface or the second surface.

According to various embodiments, the at least one DDI extends parallel to at least a portion of the third display part.

According to various embodiments, the at least one DDI is disposed on the opposite side to the at least a portion of the third display part when viewed from the first surface or the second surface.

According to various embodiments, the first display part has a flat shape on the first surface and is curved outwards in a convex shape on the side surface.

According to various embodiments, the second display part has a flat shape on the second surface and is curved outwards in a convex shape on the side surface.

According to various embodiments, the third display part is curved outwards in a convex shape on a first side surface of the housing.

According to various embodiments, the housing further includes a metal structure disposed on the first side surface of the housing.

According to various embodiments, the metal structure operates as an antenna radiator that transmits and receives a signal in a specified frequency band.

According to various embodiments, the housing includes first and second housing structures disposed inward of the display, wherein the first housing structure supports the first display part. The second housing structure supports the second display part.

According to various embodiments, the first housing structure supports the first display part and a portion of the third display part on a first side surface and is coupled with the second housing structure.

According to various embodiments, the first housing structure fixes the DDI at a position adjacent to a second side surface.

According to various embodiments, the first housing structure includes a slot at a position adjacent to the center of the first active area.

According to various embodiments, the DDI is connected to a FPCB, and the FPCB is connected to a PCB inside the electronic device through the slot.

According to various embodiments, the first display part includes an opening or a through-hole through which a portion of at least one of a physical button, a speaker, a sensor module, or a camera module is exposed to the outside.

According to various embodiments, an electronic device includes a housing that includes a first surface facing a first direction, a second surface facing a second direction opposite to the first direction, and a side surface surrounding space between the first surface and the second surface, a display disposed inside the housing and including a first display part and a second display part, wherein the first display part includes a first active area exposed through at least a portion of the first surface, and the second display part includes a second active area exposed through at least a portion of the second surface, a first DDI electrically connected with the first active area, and a second DDI electrically connected with the second active area.

According to various embodiments, the electronic device further includes a camera module adjacent to a first portion of the side surface, wherein the first DDI is disposed adjacent to the camera module, and wherein the second DDI is disposed adjacent to a second portion on the opposite side to the first portion.

According to various embodiments, the first DDI is disposed adjacent to a first side surface of the housing, and the second DDI is disposed adjacent to a second side surface on the opposite side to the first side surface.

According to various embodiments, an electronic device includes a housing that includes a first surface facing a first direction, a second surface facing a second direction opposite to the first direction, and a side surface disposed between the first surface and the second surface, a first window cover disposed on the first surface, a second window cover disposed on the second surface, and a display panel that includes a first active area, a second active area, and a non-active area connecting the first active area and the second active area, wherein light emitted from the first active area passes through the first window cover, and light emitted from the second active area passes through the second window cover.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), or a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1120), the processor may perform functions corresponding to the instructions. The computer-readable storage medium may be, for example, the memory 1130.

A computer-readable recording medium may include a hard disk, a floppy disk, a magnetic medium (e.g., a magnetic tape), an optical medium (e.g., CD-ROM, DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a housing that includes a first surface facing a first direction, a second surface facing a second direction opposite to the first direction, and a side surface surrounding space between the first surface and the second surface;
    a display that includes a first display part, a second display part, and a third display part; and
    at least one display driver integrated circuit (IC) (DDI) disposed inside the housing and electrically connected to the display,
    wherein the first display part includes a first active area exposed through at least a portion of the first surface,
    wherein the second display part includes a second active area exposed through at least a portion of the second surface,
    wherein the third display part is curved along a portion of the side surface from the first display part to the second display part and includes at least one optically transparent layer, and
    wherein the at least one DDI extends parallel to at least a portion of the third display part.

2. The electronic device of claim 1,
    wherein each of the first and second display parts includes an emissive layer, a touch panel, and at least one optically transparent layer, and
    wherein at least a portion of the third display part does not include a light-emitting device.

3. The electronic device of claim 1,
    wherein the at least one DDI includes:
        a first driver IC electrically connected to the first active area; and
        a second driver IC electrically connected to the second active area, and
        wherein the first driver IC and the second driver IC are disposed so as not to overlap each other when viewed from the first surface or the second surface.

4. The electronic device of claim 1, wherein the at least one DDI is disposed on the opposite side to the at least a portion of the third display part when viewed from the first surface or the second surface.

5. The electronic device of claim 1, wherein the first display part has a flat shape on the first surface and is curved outwards in a convex shape on the side surface.

6. The electronic device of claim 1, wherein the second display part has a flat shape on the second surface and is curved outwards in a convex shape on the side surface.

7. The electronic device of claim 1, wherein the third display part is curved outwards in a convex shape on a first side surface of the housing.

8. The electronic device of claim 7, wherein the housing further includes a metal structure disposed on the first side surface of the housing.

9. The electronic device of claim 8, wherein the metal structure operates as an antenna radiator that transmits and receives a signal in a specified frequency band.

10. The electronic device of claim 1, wherein the housing includes:
    a first housing structure and a second housing structure, each disposed inward of the display,
    wherein the first housing structure supports the first display part, and
    wherein the second housing structure supports the second display part.

11. The electronic device of claim 10, wherein the first housing structure supports the first display part and a portion of the third display part on a first side surface and is coupled with the second housing structure.

12. The electronic device of claim 11, wherein the first housing structure fixes the DDI at a position adjacent to a second side surface.

13. The electronic device of claim 10, wherein the first housing structure includes a slot at a position adjacent to the center of the first active area.

14. The electronic device of claim 13,
    wherein the DDI is connected to a flexible printed circuit board (FPCB), and
    wherein the FPCB is connected to a printed circuit board (PCB) inside the electronic device through the slot.

15. The electronic device of claim 1, wherein the first display part includes an opening or a through-hole through which a portion of at least one of a physical button, a speaker, a sensor module, or a camera module is exposed to the outside.

16. An electronic device comprising:
    a housing that includes a first surface facing a first direction, a second surface facing a second direction opposite to the first direction, and a side surface surrounding space between the first surface and the second surface;
    a display disposed inside the housing and including a first display part and a second display part, wherein the first display part includes a first active area exposed through at least a portion of the first surface, and the second display part includes a second active area exposed through at least a portion of the second surface;
    a first display driver integrated circuit (IC) (DDI) electrically connected with the first active area; and
    a second DDI electrically connected with the second active area,
    wherein the first DDI the second DDI extend parallel to each other.

17. The electronic device of claim 16,
    further comprising a camera module adjacent to a first portion of the side surface,
    wherein the first DDI is disposed adjacent to the camera module, and
    wherein the second DDI is disposed adjacent to a second portion on the opposite side to the first portion.

18. The electronic device of claim 16,
    wherein the first DDI is disposed adjacent to a first side surface of the housing, and
    wherein the second DDI is disposed adjacent to a second side surface on the opposite side to the first side surface.

* * * * *